United States Patent
Tanno et al.

(10) Patent No.: US 7,817,298 B2
(45) Date of Patent: Oct. 19, 2010

(54) IMAGE PROCESSING APPARATUS AND METHOD FOR FASTER STARTING OF AN IMAGE PROCESSING APPARATUS USING PRIORITY FUNCTIONS

(75) Inventors: Hidetoshi Tanno, Kawasaki (JP); Makoto Kikugawa, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 941 days.

(21) Appl. No.: 11/625,746

(22) Filed: Jan. 22, 2007

(65) Prior Publication Data
US 2007/0171449 A1 Jul. 26, 2007

(30) Foreign Application Priority Data
Jan. 23, 2006 (JP) .............................. 2006-014194

(51) Int. Cl.
G06K 15/00 (2006.01)
G06F 13/00 (2006.01)

(52) U.S. Cl. .................... 358/1.16; 711/102; 711/103; 711/104

(58) Field of Classification Search ............. 358/1.16; 711/102, 103, 104
See application file for complete search history.

(56) References Cited
U.S. PATENT DOCUMENTS 5,239,621 A * 8/1993 Brown et al. ............... 358/1.16
6,564,177 B1 * 5/2003 Matsunaga .................... 703/21
2003/0126427 A1 * 7/2003 Kim et al. ...................... 713/2
2003/0174362 A1 * 9/2003 Fujimaki ..................... 358/1.16
2009/0262929 A1 * 10/2009 Walmsley ..................... 380/46

FOREIGN PATENT DOCUMENTS

JP 2000-322264 11/2000

* cited by examiner

Primary Examiner—Twyler L Haskins
Assistant Examiner—Fred Guillermety
(74) Attorney, Agent, or Firm—Canon U.S.A. Inc., I.P. Division

(57) ABSTRACT

An image processing apparatus having a plurality of functions and allowing the functions to be available by starting programs for the corresponding functions includes a processor executing the programs; a main memory used by the processor to execute the programs; a first storage unit storing a program capable of being executed by the processor without being transferred to the main memory; a second storage unit storing at least one program for a corresponding one of the functions, wherein the at least one program stored in the second storage unit can be executed by the processor by being transferred to the main memory; a selection unit selecting any one of the functions; and a control unit controlling a selected program corresponding to the function selected by the selection unit, from among the at least one program stored in the second storage unit, to be stored in the first storage unit.

12 Claims, 17 Drawing Sheets

FIG. 18

STORAGE MEDIUM, SUCH AS FD OR CD-ROM

| DIRECTORY INFORMATION |
|---|
| FIRST DATA PROCESSING PROGRAM<br>PROGRAM CODE GROUP CORRESPONDING TO STEPS OF FLOWCHART SHOWN IN FIG. 5 |
| SECOND DATA PROCESSING PROGRAM<br>PROGRAM CODE GROUP CORRESPONDING TO STEPS OF FLOWCHART SHOWN IN FIG. 8 |
| THIRD DATA PROCESSING PROGRAM<br>PROGRAM CODE GROUP CORRESPONDING TO STEPS OF FLOWCHART SHOWN IN FIG. 10 |
| FOURTH DATA PROCESSING PROGRAM<br>PROGRAM CODE GROUP CORRESPONDING TO STEPS OF FLOWCHART SHOWN IN FIG. 16 |
| FIFTH DATA PROCESSING PROGRAM<br>PROGRAM CODE GROUP CORRESPONDING TO STEPS OF FLOWCHART SHOWN IN FIG. 17 |
| |

IMAGE PROCESSING APPARATUS AND METHOD FOR FASTER STARTING OF AN IMAGE PROCESSING APPARATUS USING PRIORITY FUNCTIONS

BACKGROUND OF THE INVENTION

1. Field of the Invention

The present invention relates to image processing apparatuses operating such that an arithmetic unit executes a plurality of programs individually, each of the plurality of programs having a function, so as to allow the individual functions to be available, and to methods for starting such image processing apparatuses.

2. Description of the Related Art

Known programs to be executed by image processing apparatuses, typified by digital multifunction machines, are stored as binary data in hard disk drives, and loaded into random-access memories (RAMs) at the execution of the programs by central processing units (CPUs).

The size of a program to be executed by a digital multifunction machine tends to be very large, and thus, the time required for loading the program from a hard disk drive tends to be long. Accordingly, a very long time is required before the digital multifunction machine becomes operable.

Under such circumstances, Japanese Patent Laid-Open No. 2000-322264 suggests a configuration of split (divided) programs, as a technology for dividing a program and for reducing the loading time necessary for allowing a particular function to be preferentially available.

As described in Japanese Patent Laid-Open No. 2000-322264, with this configuration, a program can be executed without storing all the program code into a main memory unit.

However, according to the technology disclosed in Japanese Patent Laid-Open No. 2000-322264, after the power is turned on, programs are loaded in a fixed order. Thus, a certain function becomes available earlier than another function. However, if a user does not want to use the function that becomes available earlier, such an earlier availability of the function is of no use to the user. For example, programs to be executed by a digital multifunction machine are loaded in the order of COPY, SCAN, SEND, and FAX. In this case, if the user wants to use the FAX function, the user cannot use the FAX function until all the programs are loaded.

In the related art, a reservation is made for a function (for example, FAX transmission) using a reservation function such that a document is read in advance and transmission is performed at midnight taking into consideration the time difference between the user and a receiver. In this case, the problem described below occurs.

When the reservation function starts, the FAX function is not available until the entire system starts although only the FAX transmission function needs to start. Thus, a long time is required for startup of the system, which includes unnecessary startup of a heater and a drum of a printing mechanism of an engine. Thus, electric power is unnecessarily consumed.

SUMMARY OF THE INVENTION

The present invention provides an image processing apparatus requiring a shorter user wait time by rapidly allowing a function desired by a user to be available.

An image processing apparatus according to an aspect of the present invention having a plurality of functions and allowing the plurality of functions to be available by starting programs for the corresponding functions includes a processor configured to execute the programs; a main memory configured to be used by the processor to execute the programs; a first storage unit configured to store a program capable of being executed by the processor without being transferred to the main memory; a second storage unit configured to store at least one program for a corresponding one of the plurality of functions, wherein the at least one program stored in the second storage unit is capable of being executed by the processor by being transferred to the main memory; a selection unit configured to select any one of the plurality of functions; and a control unit configured to control a selected program corresponding to the function selected by the selection unit, from among the at least one program stored in the second storage unit, to be stored in the first storage unit.

A method for starting an image processing apparatus that is capable of executing a plurality of functions, that includes a processor configured to execute programs, a main memory configured to be used by the processor to execute the programs, a first storage unit configured to store a program capable of being executed by the processor without being transferred to the main memory, and a second storage unit configured to store at least one program for a corresponding one of the plurality of functions, wherein the at least one program stored in the second storage unit is capable of being executed by the processor by being transferred to the main memory, and that allows the plurality of functions to be available by starting the programs for the corresponding functions includes the steps of selecting any one of the plurality of functions; and controlling a selected program corresponding to the selected function, from among the at least one program stored in the second storage unit, to be stored in the first storage unit.

Further features of the present invention will become apparent from the following description of exemplary embodiments (with reference to the attached drawings).

BRIEF DESCRIPTION OF THE DRAWINGS

FIG. 18 illustrates a memory map of a storage medium (or a recording medium) on which various data processing programs readable by an information processing apparatus (or an image processing apparatus) is stored.

DESCRIPTION OF THE EMBODIMENTS

Embodiments of the present invention will be described with reference to the drawings.

First Embodiment

<Configuration of Image Forming System>

Figure 1:
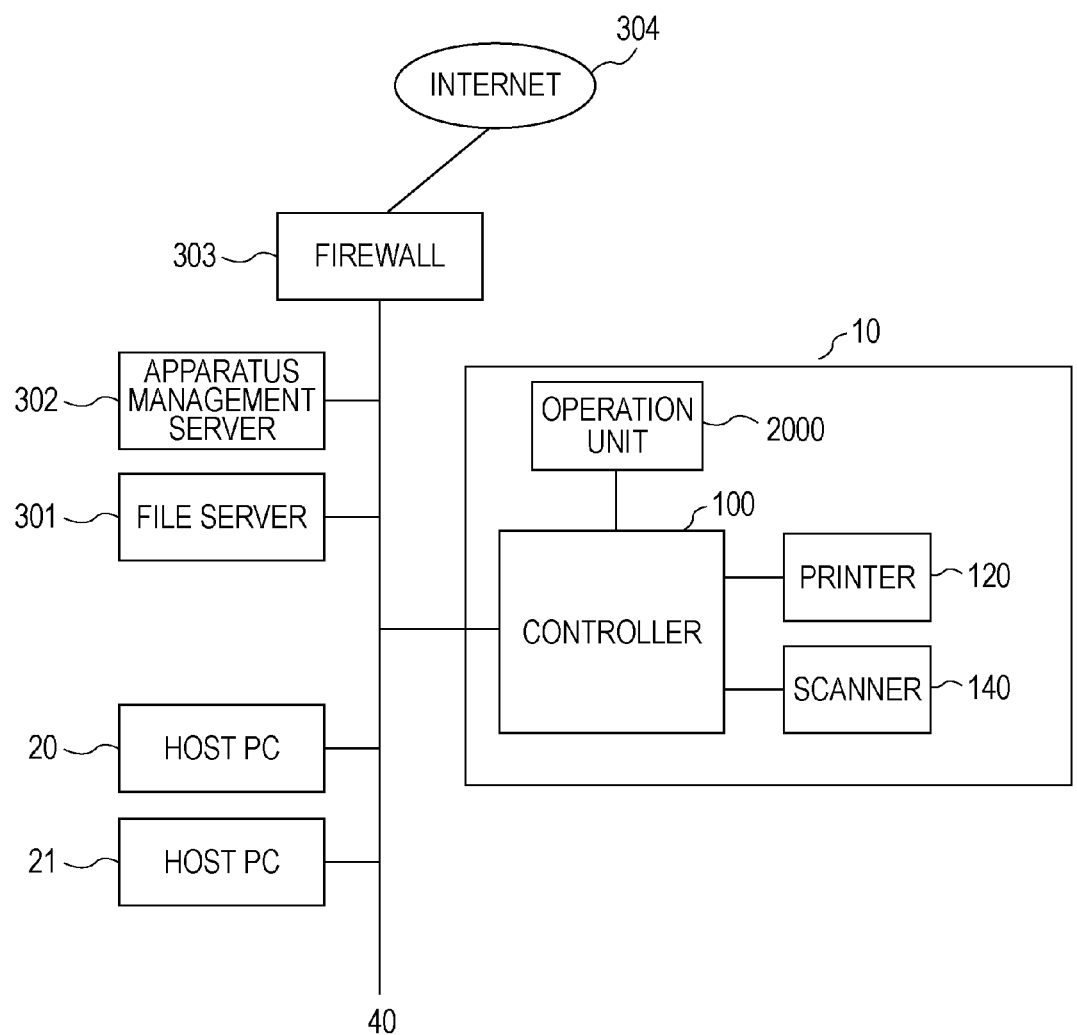
FIG. 1 is a block diagram showing an example of a configuration of a system including a digital multifunction machine to which an image processing apparatus can be applied.

FIG. 1 is a block diagram showing an example of a configuration of a system including a digital multifunction machine to which an image processing apparatus according to an aspect of the present invention can be applied.

Referring to FIG. 1, a firewall 303 connects the inside of a local-area network (LAN) 40 to an external communication network (the Internet 304), and performs security management and the like. An apparatus management server 302 manages a digital multifunction machine 10, host PCs 20 and 21, and a file server 301 that are connected to each other via the LAN 40. A plurality of users connected via the LAN 40 is able to share data supplied from the file server 301.

The digital multifunction machine 10 has functions, such as a COPY function, a FAX (facsimile) function, and a SEND function (data transmission via a network or a local interface). An image scanner 140 performs image reading processing in accordance with an instruction from an operation unit 2000, the host PC 20, or the host PC 21. A printer 120 prints data supplied from the host PC 20, the host PC 21, or the file server 301 on a sheet.

A controller unit 100 controls input of image data from the image scanner 140 and output of image data to the printer 120 in accordance with an instruction from the operation unit 2000, the host PC 20, or the host PC 21. For example, the controller unit 100 stores image data captured by the image scanner 140 into a memory contained in the controller unit 100, outputs the image data to the host PC 20 or 21, or causes the printer 120 to print the image data.

The digital multifunction machine 10 includes a unit for preferentially starting a particular function from among a plurality of functions provided in the digital multifunction machine 10 (that is, for starting a particular function earlier than the other functions) when the digital multifunction machine 10 is powered on or recovers from a sleep mode (that is, a power-saving mode). In contrast with a normal operating mode of the digital multifunction machine 10, power consumption is reduced in the sleep mode, for example, by reducing electric power to be supplied to a fusing unit or by stopping electric power to be supplied to a particular unit. In this embodiment, the digital multifunction machine 10 is provided with a plurality of functions, such as a COPY function, a FAX function, a SEND function, and a print function. The digital multifunction machine 10 may be provided with other functions.

<Scanner and Printer>

Figure 2:
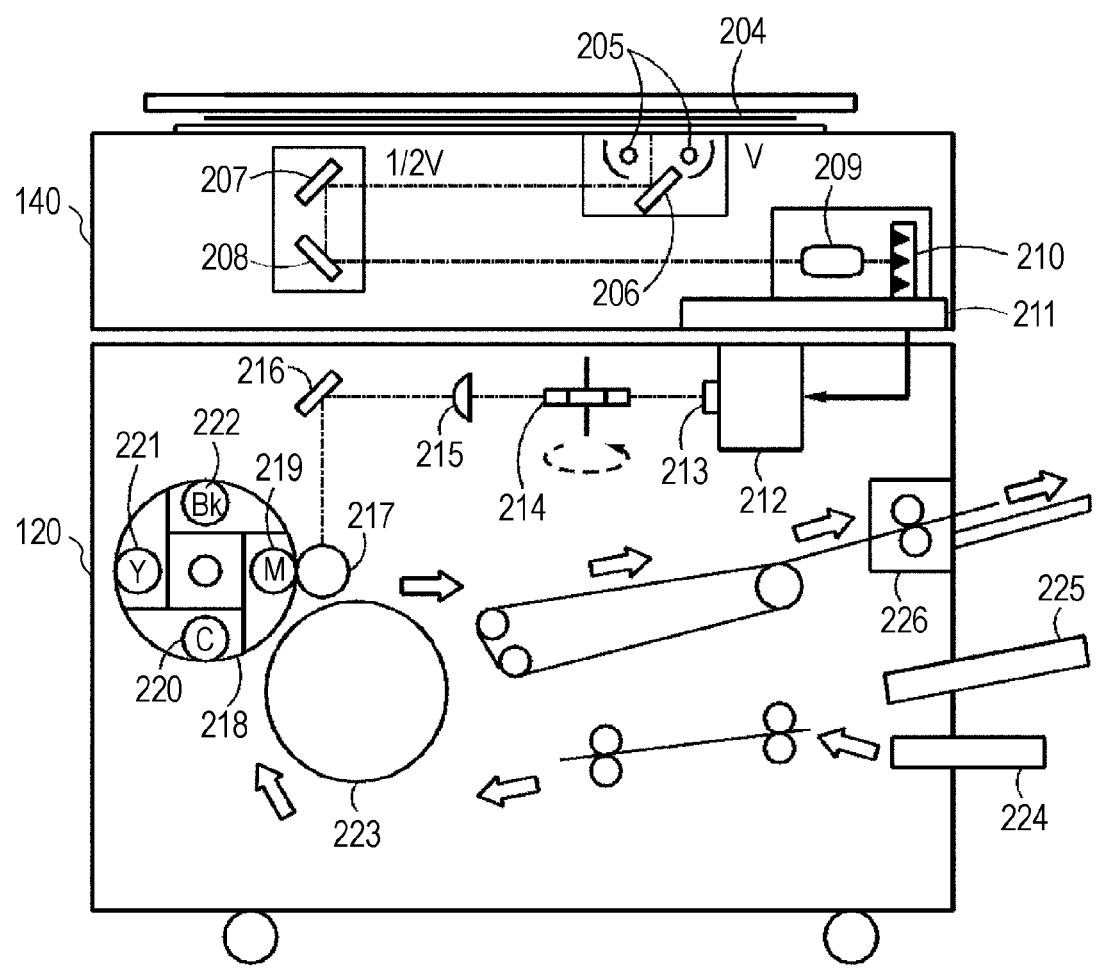
FIG. 2 is a sectional view showing configurations of a scanner and a printer of the digital multifunction machine shown in FIG. 1.

FIG. 2 is a sectional view of the digital multifunction machine 10 shown in FIG. 1.

Referring to FIG. 2, the image scanner 140 includes a document glass plate (hereinafter, referred to as a platen) 203. A document sheet 204 on the platen 203 is irradiated by a lamp 205, and is guided to a lens 209 via mirrors 206, 207, and 208. The lens 209 forms an image on a three-line sensor (hereinafter, referred to as a charge-coupled device (CCD)) 210 that converts converged light into an electric signal, and the image is transmitted as full-color information, red (R), green (G), and blue (B) components, to the controller unit 100.

A carriage that fixes the lamp 205 and the mirror 206 mechanically moves in a direction vertical to an electrical scanning direction (main scanning direction) of the line sensor at a speed of "v". The mirrors 207 and 208 mechanically move in the direction vertical to the electrical scanning direction (main scanning direction) of the line sensor at a speed of "½v". Accordingly, scanning (sub-scanning) is performed on the entire document.

Read images are stored into the memory contained in the controller unit 100. The controller unit 100 reads image data (a read image) again from the memory, performs electrical processing on the read image data to be divided into components of magenta (M), cyan (C), yellow (Y), and black (Bk), and transmits the components to the printer 120.

In a single document scanning operation performed by the image scanner 140, one of the M, C, Y, and Bk components is transmitted to the printer 120. After four document scanning operations are executed, a printout operation is completed. The image scanner 140 may include a document feeder (DF) 160 (see FIG. 3). The document feeder 160 sequentially supplies document sheets stacked on the document plate of the document feeder 160 one by one to the image scanner 140.

The printer 120 receives M, C, Y, and Bk image signals from the image scanner 140 via the controller unit 100, and transmits the M, C, Y, and Bk image signals to a laser driver 212. The laser driver 212 modulates and drives a semiconductor laser 213 in response to a received image signal. Laser beams scan over a photoconductor drum 217 via a polygon mirror 214, an f-θ lens 215, and a mirror 216.

A rotary developing device 218 includes a magenta developing unit 219, a cyan developing unit 220, a yellow developing unit 221, and a black developing unit 222. The four developing units 219 to 222 alternately contact the photoconductor drum 217. Thus, a latent image formed on the photoconductor drum 217 is developed with a toner.

A sheet supplied from a sheet cassette 224 or 225 is wound around a transfer drum 223, so that an image developed on the photoconductor drum 217 is transferred to the sheet. After four colors, M, C, Y, and Bk, are sequentially transferred as described above, the sheet passes through a fusing unit 226. Then, after the toner is fixed on the sheet, the sheet is ejected. In this embodiment, the digital multifunction machine 10 is capable of forming color images. However, the digital multifunction machine 10 may only be capable of forming black-and-white images.

<Controller Unit>

Figure 3:
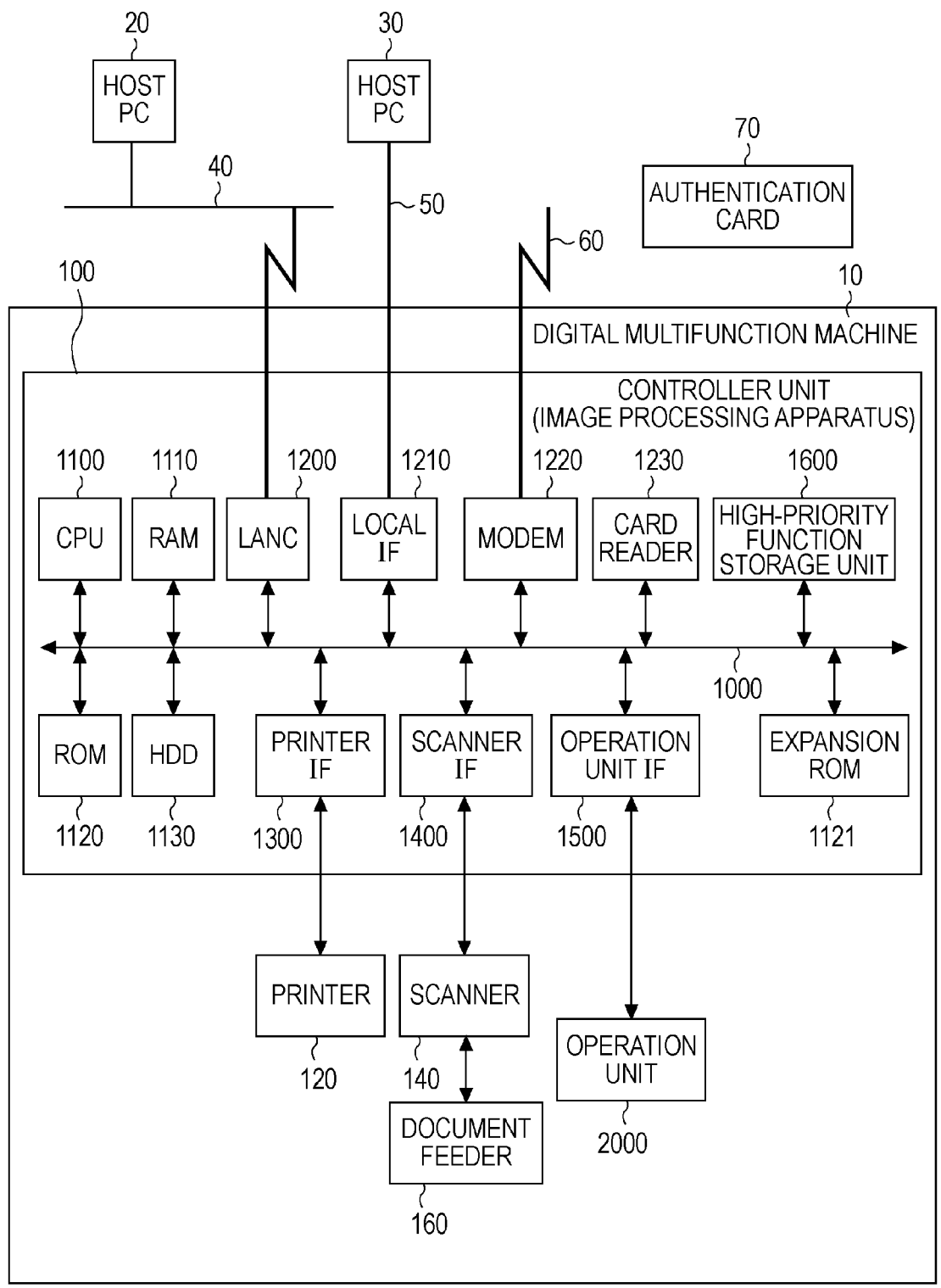
FIG. 3 shows a configuration of the digital multifunction machine and a configuration of a controller unit shown in FIG. 1.

FIG. 3 shows configurations of the digital multifunction machine 10 and the controller unit 100 shown in FIG. 1.

The controller unit 100 is connected to the image scanner 140, which is an image input device, and the printer 120, which is an image output device, and connected to the LAN 40 and a public circuit (PSTN) 60. Accordingly, the controller unit 100 serves as a controller that inputs and outputs image information and device information. The controller unit 100 contains plurality units as explained below. These units respectively connect to a system bus 1000.

A CPU (arithmetic unit) 1100 serves as a controller that controls the entire system. A RAM (main memory unit) 1110 serves as a system work memory for operating the CPU 1100, and also serves as an image memory for temporarily storing image data.

A read-only memory (ROM) 1120 serves as a boot ROM. A boot program for the system and a quick startup program are stored in the ROM 1120. An expansion ROM 1121 is provided for expanding a ROM. A function program to be added as a quick startup program is stored in the expansion ROM 1121. In this embodiment, the expansion ROM 1121 is a flash memory, and is capable of rewriting a stored program. In addition, even when the digital multifunction machine 10 is powered off, a program stored in the expansion ROM 1121 is retained. The expansion ROM 1121 may be a memory device other than the flash memory.

A hard disk drive (HDD) 1130 stores a system software program, image data, a software counter value, and the like. The system software program is a program for realizing various functions, such as a COPY function, a FAX function, a SEND function, a SCAN function, a print function, and an operation unit (UI) display function. The system software program is loaded into the ROM 1120 or the RAM 1110 and runs in the ROM 1120 or the RAM 1110. As a software counter value, a counter region for each sheet size and a counter region for each data processing capacity are set. A software counter value is calculated on the basis of a reference capacity set in advance in accordance with the number of output images and the data capacity processed by the CPU 1100. Accordingly, counting up is performed. The counter value is not necessarily stored in the HDD 1130. The counter value may be stored in a storage region in an electrically erasable programmable read-only memory (EEPROM) (not shown) as long as the counter value is stored and held even after the power is turned off.

The CPU 1100 is capable of executing a program stored in the ROM 1120 or the expansion ROM 1121 without loading the program into the RAM 1110. That is, the ROM 1120 and the expansion ROM 1121 store programs that can be executed without being loaded into the RAM 1110 by the CPU 1100. In addition, the CPU 1100 loads a program stored in the HDD 1130 to the RAM 1110 and executes the program. The program to be stored in the HDD 1130 may be compressed. In this case, the compressed program is decompressed and transferred to the RAM 1110. In this embodiment, the term "loading" includes decompression and transfer processing. A program loaded from the HDD 1130 to the RAM 1110 is capable of being executed by the CPU 1100.

A LAN controller (LANC) 1200 is connected to the LAN 40. The LANC 1200 inputs and outputs image data to be output, and inputs and outputs information relating to apparatus control. In addition, the LANC 1200 receives, in response to an input operation via the operation unit 2000, output image data corresponding to an input operation via the operation unit 2000 from the host PC 20 or an output image data management apparatus (not shown) on the network, and outputs an image.

A local interface 1210 is, for example, a universal serial bus (USB) or a Centronics interface. The local interface 1210 is connected to a host PC 30 or a printer (not shown) via a cable 50, so that the local interface 1210 inputs and outputs data. Various communication systems, such as serial communication, communication via a Bi-Centronics interface, or wireless communication, such as Bluetooth®, are available. A MODEM 1220 is connected to the public circuit 60, so that the MODEM 1120 inputs and outputs data. A card reader interface 1230 is an external interface that is capable of reading data from an authentication card 70, such as an IC card. The card reader interface 1230 does not necessarily read data from authentication cards, such as IC cards. The card reader interface 1230 may be capable of reading data from any removable medium. In addition, the card reader interface 1230 may also be capable of writing data.

A printer interface 1300 is connected to the printer 120, and communicates with the CPU of the printer 120. The printer interface 1300 performs conversion of image data. A scanner interface 1400 is connected to the image scanner 140, and communicates with the CPU of the image scanner 140. The image scanner 140 performs conversion of image data.

An operation unit interface 1500 is provided for the operation unit (UI) 2000. The operation unit interface 1500 outputs to the operation unit 2000 image data to be displayed on the operation unit 2000. In addition, the operation unit interface 1500 reports to the CPU 1100 information input by a user of the system using the operation unit 2000.

A high-priority function storage unit 1600 holds information indicating a function that is preferentially available when the digital multifunction machine 10 is powered on or recovers from the sleep mode (that is, a function corresponding to a quick startup program stored in the ROM 1120 or the expansion ROM 1121).

The operation unit 2000 includes an input unit, such as a numerical keypad, a copy start button, and a touch panel, and a display unit, such as a liquid crystal display (LCD) device. The touch panel is provided on the LCD display device.

The digital multifunction machine 10 includes a power switch (not shown), which is a hard switch. The power switch causes a power source unit (not shown) to start supplying power, and shifts the power source unit from an OFF state into an ON state. In addition, the power switch causes the digital multifunction machine 10 to recover from the sleep mode in which a startup procedure similar to a procedure performed in the ON state is required.

<Split-Program Configuration>

Figure 4A:
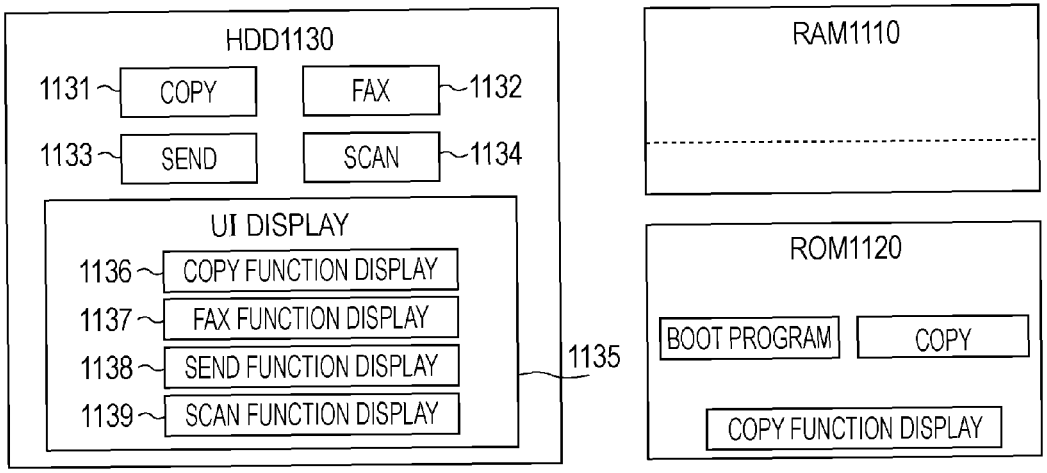
FIGS. 4A to 4C are block diagrams showing configurations of system software (programs) stored in an HDD or a ROM shown in FIG. 3 (split-program configurations or split-program applications).
Figure 4B:
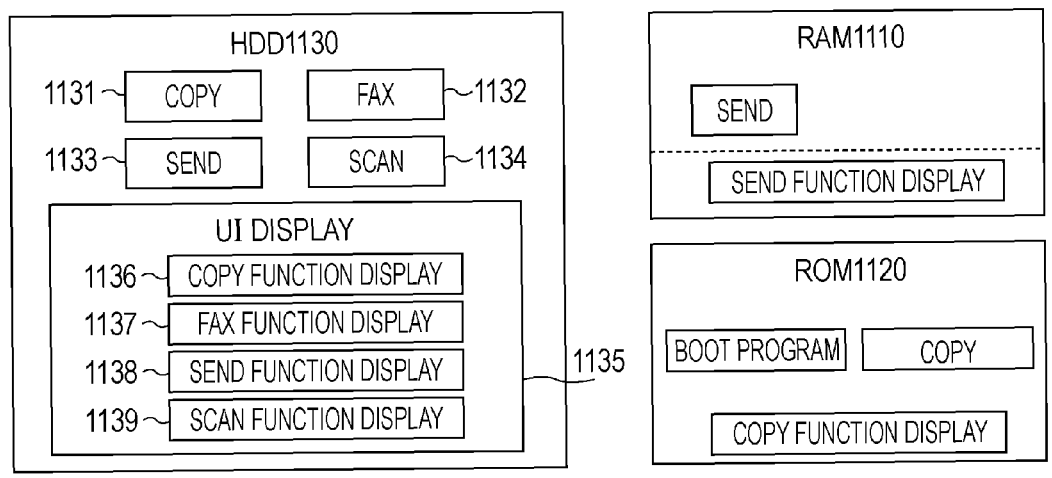
Figure 4C:
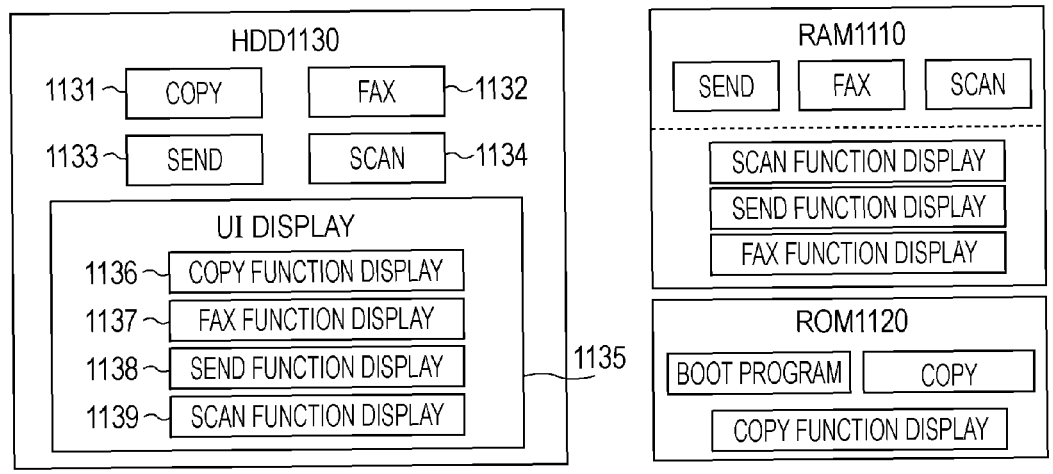

FIGS. 4A to 4C are block diagrams showing examples of a configuration of system software stored in the HDD 1130 and the ROM 1120 shown in FIG. 3, that is, a configuration of split programs.

System software (hereinafter, referred to as a program) has an individual (split) structure based on a corresponding function (a COPY function, a FAX function, a SEND function, or a SCAN function) of the digital multifunction machine 10. Such a configuration including the split programs is called a split-program configuration. When the digital multifunction machine 10 has another function, the digital multifunction machine 10 may be configured to include a program corresponding to the function.

FIGS. 4A to 4C show examples in which a program corresponding to the COPY function is stored in the ROM 1120 and in which programs corresponding to the other functions (the FAX function, the SEND function, and the SCAN function) are stored in the HDD 1130.

Referring to FIGS. 4A to 4C, a program and data 1131 for executing the COPY function, a program and data 1132 for executing the FAX function, a program and data 1133 for executing the SEND function, a program and data 1134 for executing the SCAN function, and a program and data 1135 for executing a UI display function are provided. In this embodiment, the program and data for executing the COPY function is called a COPY program or a COPY function program. In addition, the other functions are referred to in a similar way. For example, the program for executing the FAX function is called a FAX program or a FAX function program.

The UI display program 1135 includes a COPY function display program 1136, a FAX function display program 1137, a SEND function display program 1138, and a SCAN function display program 1139. Theses display programs 1136 to 1139 are provided for receiving instructions for respective functions from the operation unit 2000 and for executing display on the operation unit 2000. The UI display program 1135 also has a split-program configuration.

When the digital multifunction machine 10 is powered on and starts, the CPU 1100 reads the boot program from the ROM 1120. Then, the CPU 1100 loads programs for various functions from the HDD 1130 to the RAM 1110. Thus, the CPU 1100 is capable of executing various functions.

<Loading of Split Program>

A case where the COPY function preferentially starts will be described.

FIG. 4A shows a state when the digital multifunction machine 10 is powered on. In this state, no function has yet been loaded from the HDD 1130 to the RAM 1110. In this state, the COPY program is stored in the ROM 1120. Since the COPY program has already been stored in the ROM 1120, only the COPY function is available even though the other functions are not available.

FIG. 4B shows a state in which the SEND function stored in the HDD 1130 is preferentially started and in which the SEND program 1133 and the SEND function display program 1138 are downloaded from the HDD 1130 to the RAM 1110 in first program function loading processing. In this state, the COPY function program has already been stored in the ROM 1120 and the SEND program has already been loaded into the RAM 1110, which is a main memory. Thus, only the COPY function and the SEND function are available even though the other functions are not available.

FIG. 4C shows a state in which programs of all the functions provided in the digital multifunction machine 10 are downloaded from the HDD 1130 to the RAM 1110. In this state, all the functions provided in the digital multifunction machine 10 are available.

As shown in FIGS. 4A to 4C, the COPY function, which is a high-priority function, is stored in the ROM 1120 that can be accessed by the CPU 1100 immediately after the power is turned on. Thus, the user is able to use the COPY function without any wait time.

<Exchange of High-Priority Program>

A process for exchanging function programs in the ROM 1120 will be described with reference to the flowchart shown in FIG. 5. In this embodiment, the ROM 1120 shown in FIG. 3 is, for example, a rewritable storage medium, such as a flash memory.

Figure 5:
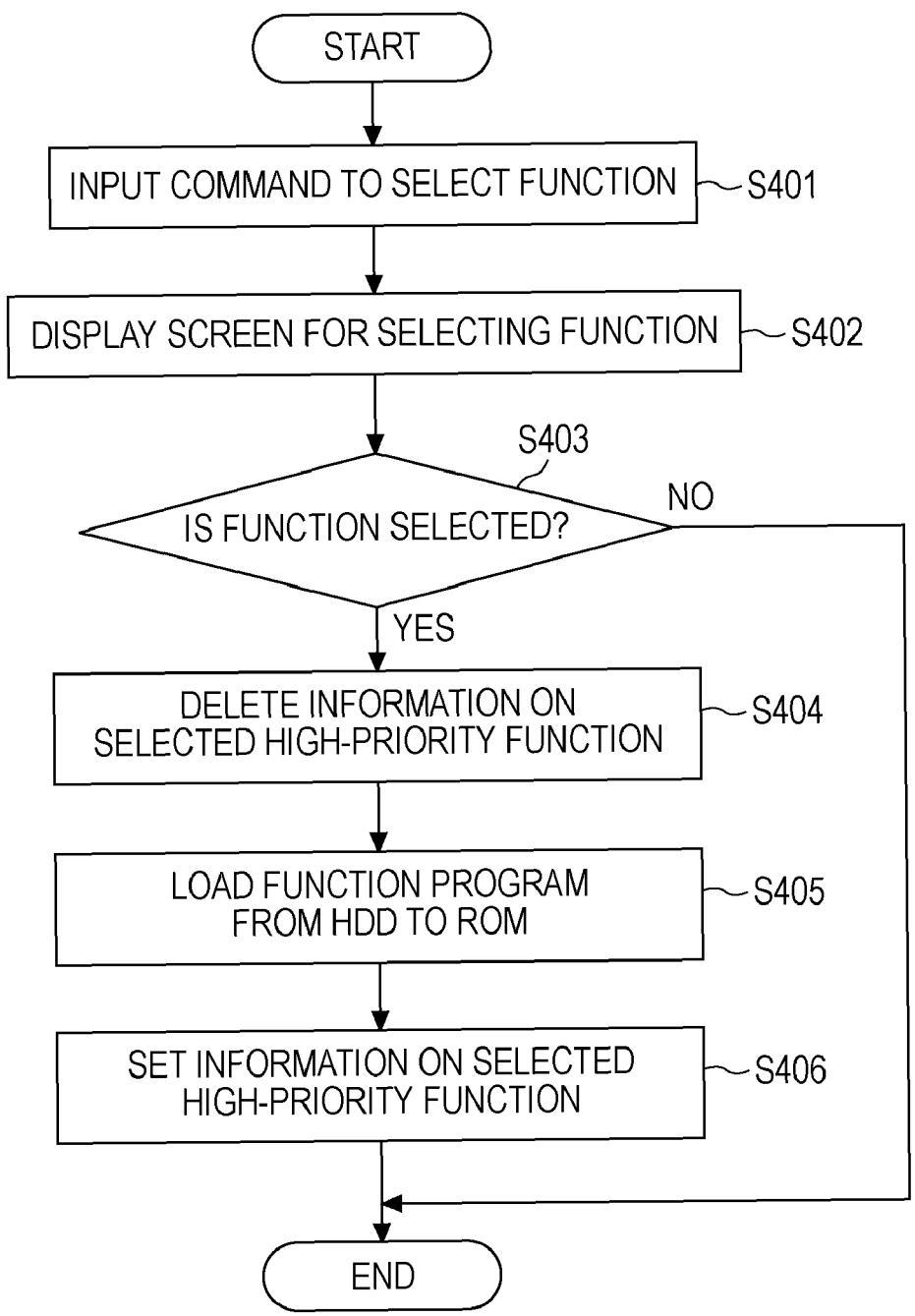
FIG. 5 is a flowchart showing an example of a control process performed by the digital multifunction machine.

FIG. 5 is a flowchart showing an example of a first control process according to an aspect of the present invention. The first control process corresponds to a process for exchange of quick startup programs in the ROM 1120 according to this embodiment. The controller unit 100 performs the process shown by this flowchart. This process corresponds to a process realized when the CPU 1100 reads to the RAM 1110 a program (not shown) stored in the HDD 1130 and executes the program. Processing in steps S401 to S406 will now be described.

A case where a quick startup program stored in the ROM 1120 is changed from a "COPY function program" into a "SEND function program" will be described as an example.

When the user wants to change a quick startup program stored in the ROM 1120, the user inputs a command, using the operation unit 2000 of the digital multifunction machine 10, to display a screen for selecting a quick startup function. When the command to display the screen for selecting a quick startup function is input via the operation unit 2000 (step S401), the CPU 1100 displays on the display unit of the operation unit 2000, which is provided with the touch panel, the screen for selecting a quick startup function in step S402. Thus, the user is able to select a quick startup function.

Figure 6:
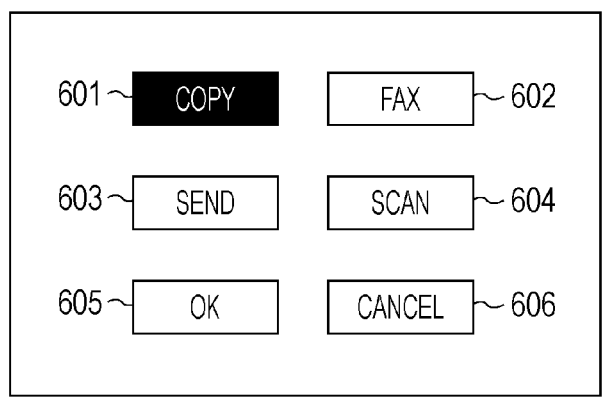
FIG. 6 shows an example of a screen for selecting a quick startup function in an embodiment of the present invention.

FIG. 6 shows an example of the screen used in this embodiment for selecting a quick startup function.

Referring to FIG. 6, the screen for selecting a quick startup function includes a COPY function selection button 601, a FAX function selection button 602, a SEND function selection button 603, and a SCAN function selection button 604. Only one of the buttons 601 to 604 can be selected. In this example, the COPY function selection button 601 is selected.

An OK button 605 is used for fixing the selection made on the screen for selecting a quick startup function. A cancel button 606 is used for canceling the selection made on the screen for selecting a quick startup function.

Operation information input on the screen for selecting a quick startup function is transmitted to the CPU 1100 via the operation unit interface 1500.

Referring back to the flowchart shown in FIG. 5, in step S403, the CPU 1100 determines whether or not a function is selected (or a program corresponding to a function is selected) on the screen for selecting a quick startup function. If it is determined in step S403 that no function is selected (or the cancel button 606 is selected) on the screen for selecting a quick startup function, that is, if the determination in step S403 is NO, the CPU 1100 terminates the process.

In contrast, if it is determined in step S403 that a function is selected (or the OK button 605 is selected) on the screen for selecting a quick startup function, that is, if the determination in step S403 is YES, the process proceeds to step S404. However, even when the OK button 605 is selected, if a selected quick startup function is not changed, the CPU 1100 terminates the process. In this example, the SEND function is selected, in exchange for the COPY function.

In step S404, the CPU 1100 deletes information on the function (in this example, the COPY function) stored in the high-priority function storage unit 1600.

In step S405, the CPU 1100 reads from the HDD 1130 the function (in this example, the SEND function) program corresponding to the selected function (in this example, the SEND function), and stores the read function (in this example, the SEND function) program into the ROM 1120.

In addition, in step S406, the CPU 1100 writes to the high-priority function storage unit 1600 the information on the function (in this example, the SEND function) newly stored in the ROM 1120, and terminates the process.

When the above-described process is performed, the user is able to preferentially use the function (in this example, the SEND function) stored in the ROM 1120 immediately after the power is next turned on.

Since the COPY function program is overwritten with the SEND function program in step S405, the COPY function program is deleted from the ROM 1120. However, since the COPY program 1134, which is the same as the COPY function program, is held in the HDD 1130, the COPY function program is read from the HDD 1130 when the power is next turned on.

Figure 7:
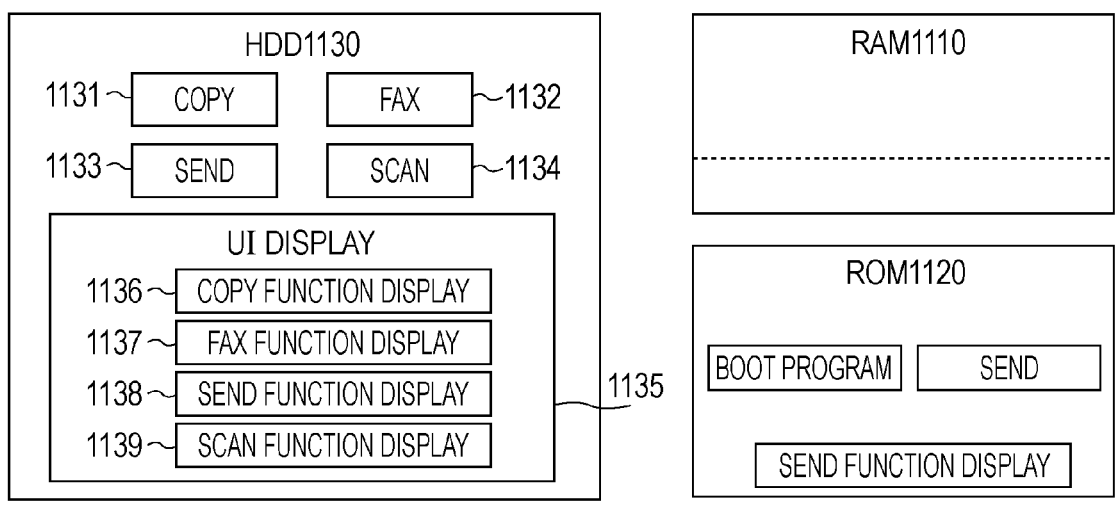
FIG. 7 shows a state when the digital multifunction machine in which a SEND function is stored as a high-priority function in the ROM is powered on and before each program for a corresponding function is downloaded from the HDD to a RAM.

FIG. 7 shows a state of the digital multifunction machine 10 in which the SEND function, which is set as a quick startup function, is stored in the ROM 1120. In this state, no function program has yet been loaded into the RAM 1110.

In this case, the SEND program has already been stored in the ROM 1120. Thus, only the SEND function is available immediately after the power is turned on even though the other functions are not available.

Due to the above-described processing, a program for a function designated by the user is started earlier than the other programs, so that the designated function is available immediately after the power is turned on. Thus, the user wait time is considerably reduced, and the digital multifunction machine is available immediately after the power is turned on.

Second Embodiment

<Addition of Memory for High-Priority Program>

In the first embodiment, the configuration that enables exchange of quick startup programs stored in the ROM 1120 and that changes a preferentially available function has been described. In a second embodiment, a configuration in which a quick startup program is added to the expansion ROM 1121, in addition to the ROM 1120, for a user who desires another high-priority function will be described.

In this configuration, the digital multifunction machine 10 includes, as well as the ROM 1120, a ROM connector (not shown) for expansion, in order to add a ROM having a capacity corresponding to the capacity of a quick startup high-priority program desired by the user. The expansion ROM 1121 is a writable memory, and thus, function programs can be exchanged. In this embodiment, a flash memory is used as the expansion ROM 1121.

<Addition of High-Priority Program>

A process to store a function program into the expansion ROM 1121 will be described with reference to the flowchart shown in FIG. 8.

Figure 8:
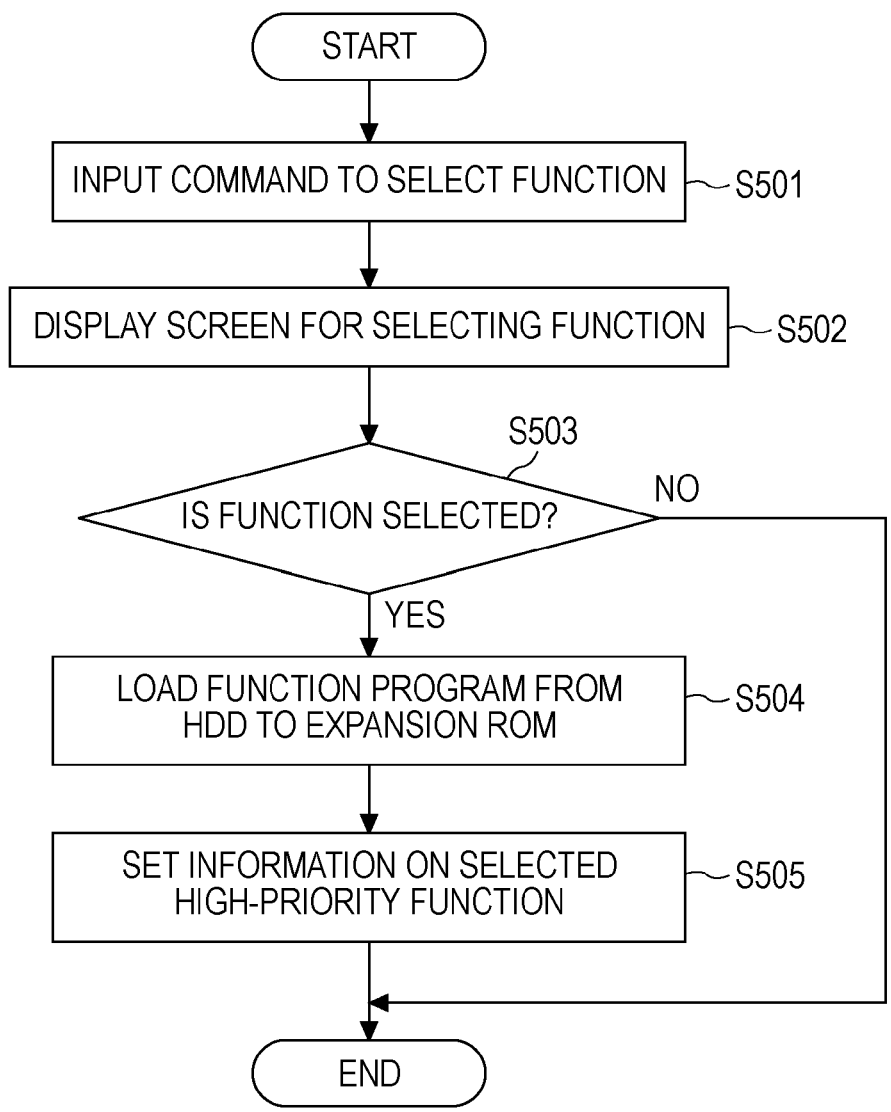
FIG. 8 is a flowchart showing an example of a control process performed by the digital multifunction machine.

FIG. 8 is a flowchart showing an example of a control process according to this embodiment, and the control process corresponds to a process to store a function program into the expansion ROM 1121. The controller unit 100 performs the process shown by this flowchart. This process corresponds to a process realized when the CPU 1100 reads a program (not shown) stored in the HDD 1130 into the RAM 1110 and executes the read program. Processing in steps S501 to S505 will now be described.

In this embodiment, an example in which, in addition to a COPY function program stored in the ROM 1120 by default, a SEND function program is stored into the expansion ROM 1121 by a user will be described.

When the user wants to add a quick startup program to the expansion ROM 1121, the user inputs, using the operation unit 2000 of the digital multifunction machine 10, a command to select a quick startup function (step S501). In step S502, the CPU 1100 displays on the display unit of the operation unit 2000, which is provided with the touch panel, a screen for selecting a quick startup function (see FIG. 6). In this embodiment, a function that has already been stored in the ROM 1120 or the expansion ROM 1121 is inversely displayed, and the inversely displayed function cannot be selected.

In step S503, the CPU 1100 determines whether or not a function is selected. If it is determined in step S503 that no function is selected (or the cancel button 606 is selected or the like), that is, if the determination in step S503 is NO, the CPU 1100 terminates the process.

In contrast, if it is determined in step S503 that a quick startup function is selected (or the OK button 605 is selected), that is, if the determination in step S503 is YES, the CPU 1100 proceeds to step S504. In this example, the SEND function is selected as a function to be added.

In step S504, the CPU 1100 reads from the HDD 1130 the function (in this example, the SEND function) program corresponding to the selected function (in this example, the SEND function), and stores the read function program into the expansion ROM 1121.

In step S505, the CPU 1100 reads to the high-priority function storage unit 1600 information on the function (in this example, the SEND function) newly stored in the expansion ROM 1121, and terminates the process.

Due to the above-described process, the user is able to preferentially use, in addition to the COPY program stored in the ROM 1120, the function program (in this example, the SEND program) stored in the expansion ROM 1121 immediately after the power is next turned on.

Figure 9:
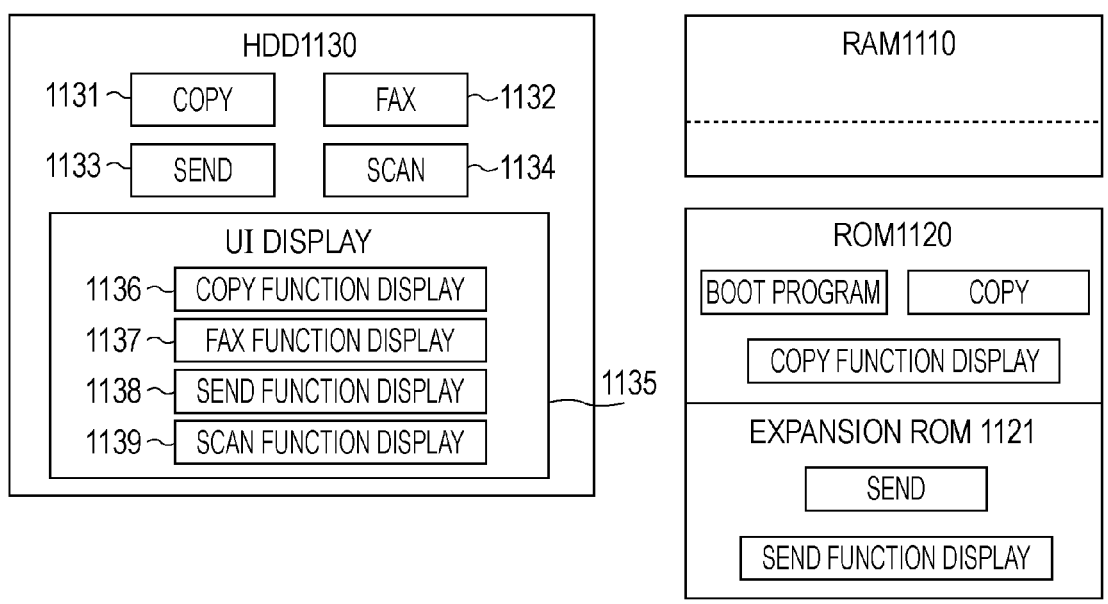
FIG. 9 shows a state when the digital multifunction machine in which the SEND function is stored in an expansion ROM installed in the digital multifunction machine is powered on and before a program for another function is downloaded from the HDD to the RAM.

FIG. 9 shows a state when the digital multifunction machine 10 in which the SEND function program has already been stored in the expansion ROM 1121, which is installed in the digital multifunction machine 10, is powered on. In this state, another function program has not yet been downloaded from the HDD 1130 to the RAM 1110.

In this case, the COPY program has already been stored in the ROM 1120 and the SEND program has already been stored in the expansion ROM 1121. Thus, the COPY function and the SEND function are available immediately after the power is turned on even though the other functions are not available.

In this embodiment, a mask ROM may be used as the expansion ROM 1121, in terms of cost savings. In this case, a high-priority function (for example, a SEND function) is stored in the expansion ROM before shipping. Mask ROMs are configured to hold data as a circuit in advance. Thus, unlike a PROM, the cost of mask ROM is inexpensive since a write circuit is not necessary.

When a mask ROM is used as the expansion ROM 1121, the process shown by the flowchart of FIG. 8 is not performed. Instead of the process shown in FIG. 8, the user connects a mask ROM in which a high-priority function (for example, the SEND function) has already been stored to a ROM connector (not shown) of the digital multifunction machine 10 when the digital multifunction machine 10 is powered off. Thus, when the digital multifunction machine 10 is powered on, the function program stored in the mask ROM is preferentially started, so that the corresponding function is immediately available.

Due to the above-described processing, a function desired by a user, as well as a default program, can be preferentially started when the power is turned on. Thus, the user is able to immediately use the corresponding functions. Accordingly, the user wait time is considerably reduced, and the user is able to use a digital multifunction machine immediately after the power is turned on.

Third Embodiment

In the first embodiment, the configuration in which a quick startup program stored in the ROM 1120 is replaced with another function program in order to change a preferentially available function has been described. In a third embodiment, in addition to a high-priority function set by default, another function program can be added to the ROM 1120. For example, a local interface function can be added. The local interface function is capable of installing a USB memory in a local interface, such as a USB interface, so that image data can be input and output through the USB memory.

In this configuration, the ROM 1120 of the digital multifunction machine 10 is a writable storage medium, such as a flash memory.

<Addition of High-Priority Program>

A process to store a function program into a free space of the ROM 1120 (a process to add a function program) will be described with reference to a flowchart shown in FIG. 10.

Figure 10:
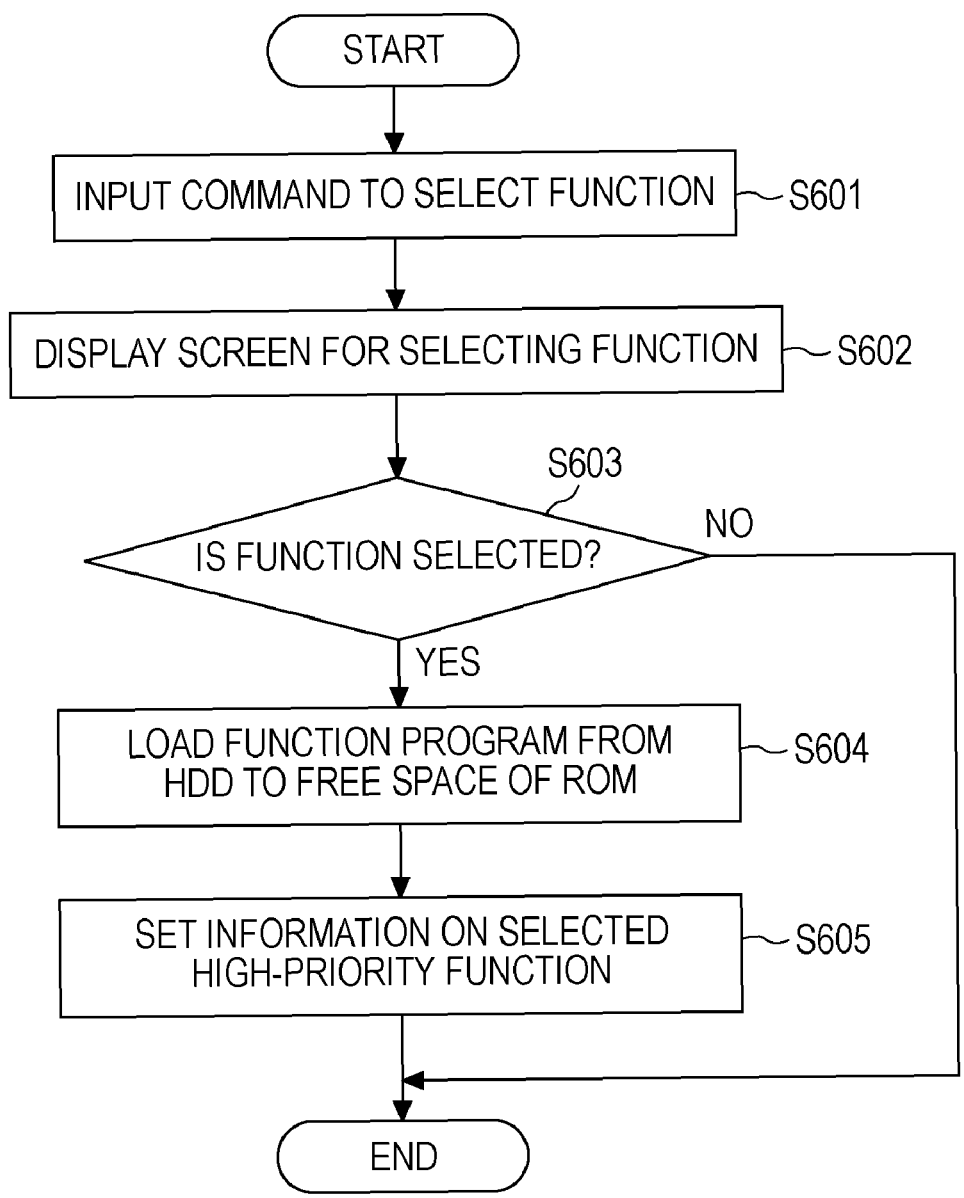
FIG. 10 is a flowchart showing an example of a control process performed by the digital multifunction machine.

FIG. 10 is a flowchart showing an example of a control process according to this embodiment, and the control process corresponds to a process according to this embodiment to store a function program into a free space of the ROM 1120. The controller unit 100 performs the process shown by this flowchart. This process corresponds to a process realized when the CPU 1100 reads to the RAM 1110 a program (not shown) stored in the HDD 1130 and executes the read program. Processing in steps S601 to S605 will be described.

In this embodiment, an example in which, in addition to a COPY program stored in the ROM 1120 by default, a program for a local interface function (that is, a local interface program) is stored into the free space of the ROM 1120 by a user will be described.

When the user wants to store a quick startup program into the free space of the ROM 1120, the user inputs, using the operation unit 2000 of the digital multifunction machine 10, a command to select a quick startup function (step S601). In step S602, the CPU 1100 displays on the display unit of the operation unit 2000, which is provided with the touch panel, a screen for selecting a quick startup function (see FIG. 6). In this embodiment, from among the buttons 601 to 604 (or more buttons), a button corresponding to a function program having a size that can be stored in the free space of the ROM 1120 is displayed on the screen for selecting a quick startup function. In this example, a button corresponding to the local interface program is displayed.

In step S603, the CPU 1100 determines whether or not a function is selected. If it is determined in step S603 that no function is selected (or the cancel button 606 is selected or the like), the CPU 1100 terminates the process.

In contrast, if it is determined in step S603 that a function is selected (or the OK button 605 is selected), the CPU 1100 proceeds to step S604. In this example, the local interface function is selected as a function to be added.

In step S604, the CPU 1100 reads from the HDD 1130 a function program (in this example, the local interface program) corresponding to the selected function, and stores the read function program into the free space of the ROM 1120.

In step S605, the CPU 1100 writes to the high-priority function storage unit 1600 information on the function (in this example, the local interface function) newly stored in the ROM 1120, and terminates the process.

Thus, the user is able to preferentially use functions (in this example, the local interface function as well as the COPY function) stored in the ROM 1120 immediately after the power is next turned on.

Figure 11:
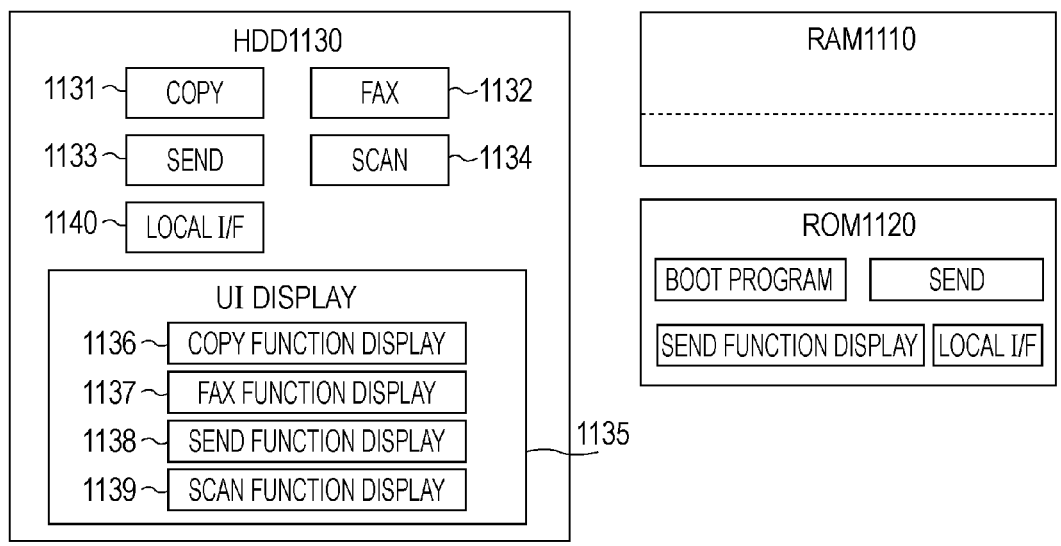
FIG. 11 shows a state when a local interface function program is loaded into the ROM.

FIG. 11 shows a state when a local interface function program 1140 is downloaded to the ROM 1120. In this state, the COPY program 1131 and the local interface program 1140 have already been stored in the ROM 1120. Thus, the COPY function and the local interface function are available even though the other functions are not available.

The case where the local interface function is added has been described above. However, a function to be added may be a FAX function, a SCAN function, or the like.

Fourth Embodiment

In a fourth embodiment, a function program corresponding to processing reserved for the next startup of the digital multifunction machine 10 is downloaded in advance to the ROM 1120. Thus, when the digital multifunction machine 10 is next started, the function program stored in the ROM 1120 is started so that the reserved process can be immediately executed.

Figure 12:
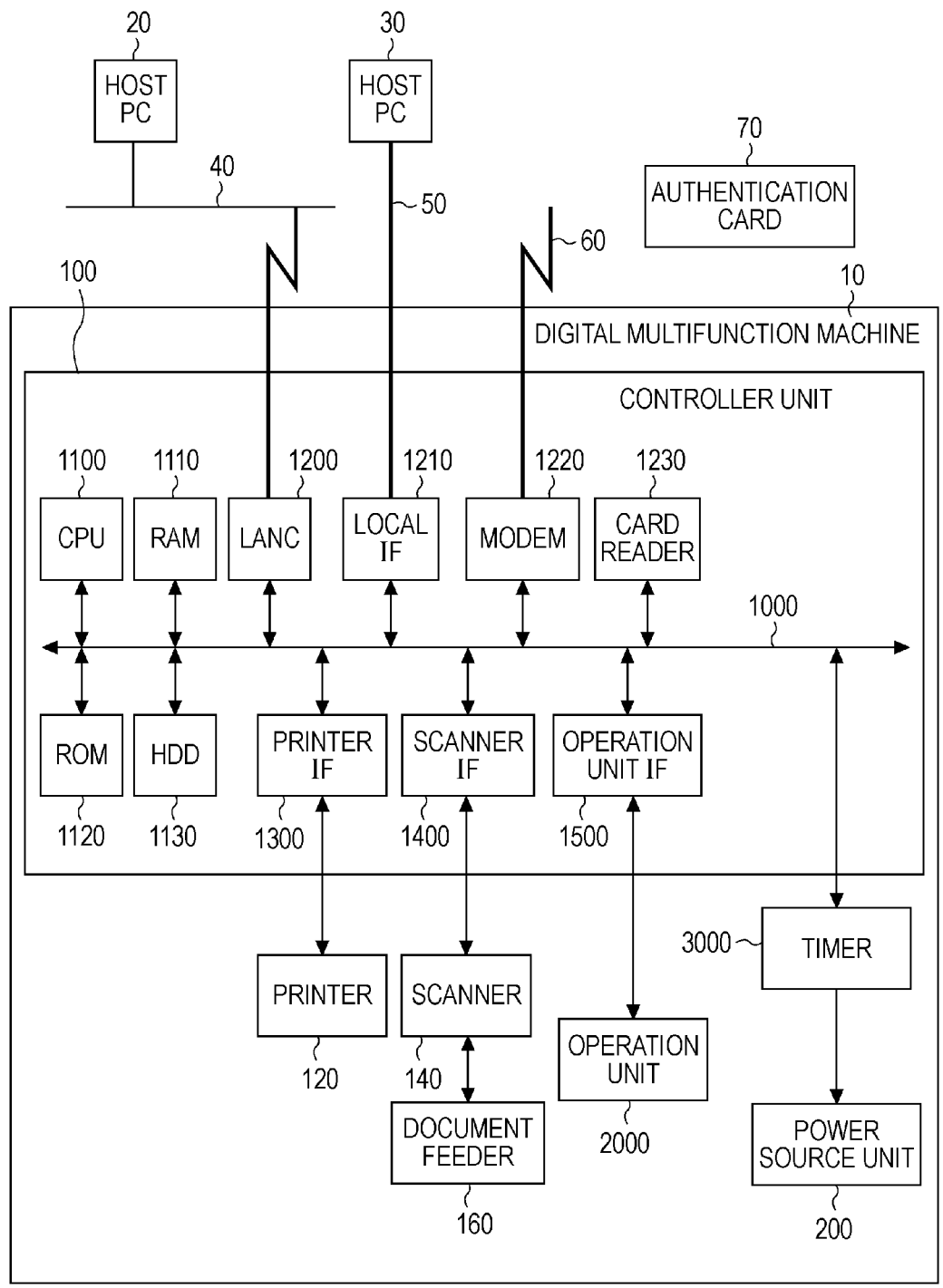
FIG. 12 shows a configuration of the digital multifunction machine and a configuration of the controller unit according to a fourth embodiment.

FIG. 12 shows a configuration of the digital multifunction machine 10 and a configuration of the controller unit 100 according to the fourth embodiment. In FIG. 12, the same parts as in FIG. 3 are referred to with the same reference numerals and the descriptions of those same parts will not be repeated here.

Referring to FIG. 12, a timer 3000 is capable of setting a power-on recovery time by means of the CPU 1100. At the time corresponding to a set power-on recovery time (or the time corresponding to information indicating time or information on elapsed time), the timer 3000 turns on the power source to start the digital multifunction machine 10.

In this embodiment, the ROM 1120 shown in FIG. 3 is a flash memory.

<Split-Program Configuration>

Figure 13:
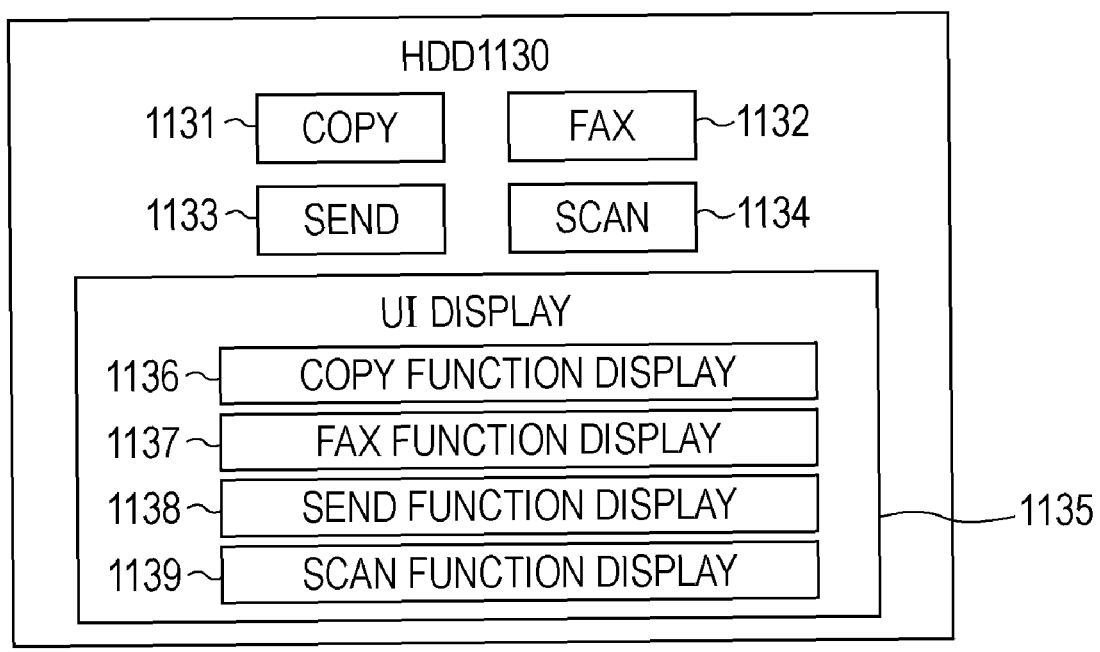
FIG. 13 is a block diagram showing a configuration of system software (programs) stored in the HDD shown in FIG. 3 (split-program configurations or split-program applications).

FIG. 13 is a block diagram showing a configuration of system software (that is, programs) stored in the HDD 1130 shown in FIG. 3 (that is, a split-program configuration). In FIG. 13, the same parts as in FIG. 4 are referred to with the same reference numerals and the descriptions of those same parts will not be repeated here.

FIG. 13 shows an example in which programs are stored in the HDD 1130 when the digital multifunction machine 10 has a COPY function, a FAX function, a SEND function, and SCAN function.

When the digital multifunction machine 10 is powered on and starts, the CPU 1100 reads a boot program from the ROM 1120. Then, the CPU 1100 loads programs for corresponding functions from the HDD 1130 to the RAM 1110. Thus, the CPU 1100 is capable of executing each of the functions.

<Startup of Split Program>

Launching of a program used in this embodiment will be described with reference to FIGS. 14A to 14C.

Figure 14A:
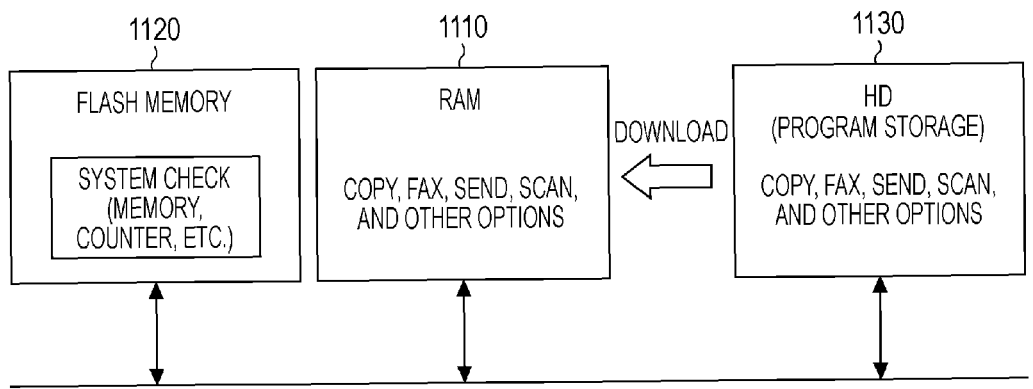
FIGS. 14A to 14C show configurations of system startup of the system software (programs) stored in the HDD shown in FIG. 13.
Figure 14B:
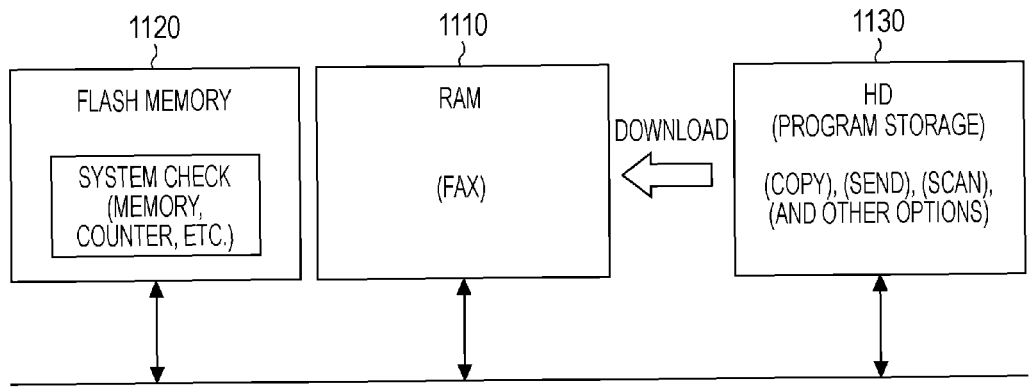
Figure 14C:
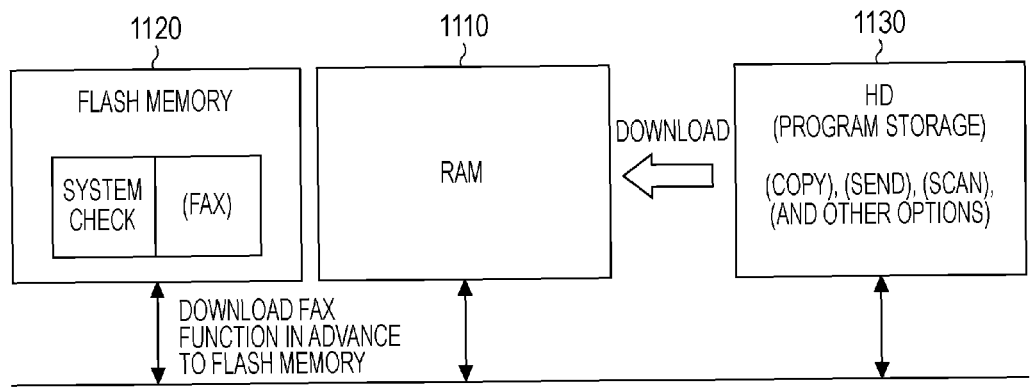

FIGS. 14A to 14C show startup of system software (that is, a program) stored in the HDD 1130 shown in FIG. 13.

<Startup of Known System>

FIG. 14A shows startup of a known system.

As shown in FIG. 14A, the CPU 1100 starts the system in accordance with processing (A) to (C).

Processing (A): The CPU 1100 reads a program for a system check function from the flash memory (the ROM 1120) to perform basic startup of the system. The system check includes access check of the RAM 1110, access check of the operation unit interface 1500, access check of the card reader interface 1230, and the like.

Processing (B): The CPU 1100 downloads a COPY function, a FAX function, a SCAN function, a SEND function, and the other functions from the HDD 1130 to the RAM 1110.

Processing (C): The CPU 1100 starts the functions of the system by means of the programs downloaded to the RAM 1110.

According to the known procedure shown in FIG. 14A, in the above-described processing (B) and (C), all the functions, such as the COPY function, the FAX function, the SCAN function, and the SEND function, of the digital multifunction machine 10 are downloaded, and the system is started. Thus, a long time is required before the functions become available.

The more functions the system includes, the longer time the startup of the system takes. In accordance with this, the user needs to wait for a longer time. When the apparatus is not used, keeping the power of the system on consumes unnecessary electric power. This does not contribute to electric power savings.

<Startup by Means of Split Program>

FIG. 14B shows startup by means of a split program.

According to the system startup by means of a split program, after a preferentially started function becomes available, the other functions are sequentially started. Such system startup will be described by processing (i) to (iv).

Processing (i): When tuning on of the power or recovery from the sleep mode is instructed, the CPU 1100 reads a program for a system check function from the flash memory (the ROM 1120) and performs basic startup of the system.

Processing (ii): After the system starts, a function set as a high-priority function (that is, a function recorded in the high-priority function storage unit 1600) is acquired. The CPU 1100 loads a function program corresponding to the high-priority function from the HDD 1130 to the RAM 1110. In this example, the FAX function is designated as a high-priority function. Thus, the CPU 1100 loads the FAX program 1132 from the HDD 1130 to the RAM 1110.

Processing (iii): The CPU 1100 starts the FAX function by means of the FAX program 1132 downloaded to the SDRAM (that is, the RAM 1110).

Processing (iv): In a state where the FAX operation is available, the CPU 1100 sequentially loads the other functions from the HDD 1130 to the RAM 1110 to start the functions.

In accordance with the above-described processing (i) to (iv), the system can be started such that the highest priority is given to the FAX function.

The example in which the highest priority is given to the FAX function has been described with reference to FIG. 14B. When there are split programs for respective functions as shown in FIG. 13 and a high-priority function for startup is set, the high-priority function can be started.

<Procedure for Starting Function More Rapidly by Means of Split Program>

FIG. 14C shows a procedure for a starting function more rapidly by means of a split program.

In this embodiment, a function to be preferentially started is downloaded in advance to the flash memory (the ROM 1120), and the function is started rapidly so as to be preferentially available. A procedure for rapidly starting a high-priority function will be described by processing (I) to (III).

Processing (I): When turning on of the power or recovery from the sleep mode is instructed, the CPU 1100 reads a program for a system check function from the flash memory (that is, the ROM 1120) and performs basic startup of the system. In addition, the CPU 1100 reads the FAX program, which is downloaded in advance to the ROM 1120, to start the FAX function.

Processing (II): In a state where the FAX function is available, the other functions are downloaded from the HDD 1130 to the SDRAM (that is, the RAM 1110).

Processing (III): The other functions downloaded to the RAM 1110 are started. Accordingly, the FAX function can be preferentially started.

According to the above-described processing (I) to (III), more rapid startup is achieved such that the highest priority is given to the FAX function, compared with the startup procedure described with reference to FIG. 14B.

A startup process of a reserved function according to this embodiment will be described with reference to FIG. 15.

Figure 15:
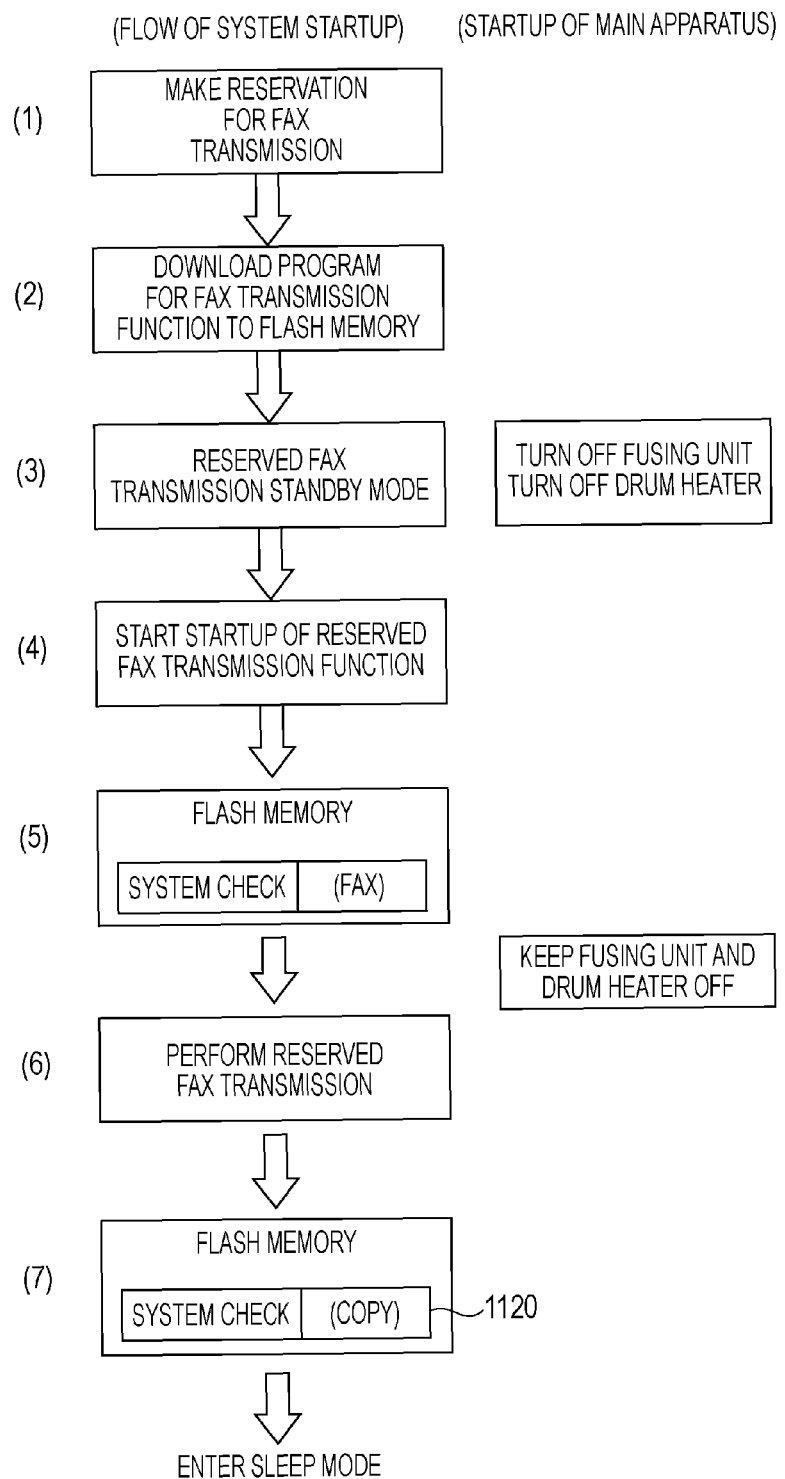
FIG. 15 illustrates the flow of a process to start a reserved function in the fourth embodiment.

FIG. 15 illustrates the flow of a process to start a reserved function according to this embodiment. The controller unit 100 shown in FIG. 3 executes each function.

Block (1): A user makes, using the operation unit 2000, a reservation for FAX transmission. For example, an instruction, such as "five hours later", may be set. Alternatively, for example, time may be set.

Block (2): When detecting the reservation for FAX transmission made in block (1), the CPU 1100 stores reservation information into a table within the HDD 1130. In addition, the CPU 1100 sets the timer 3000 to turn on the power at the reserved time. In addition, the CPU 1100 downloads the FAX program 1132 to the flash memory (that is, the ROM 1120) before entering a reservation standby mode. If a function program corresponding to a reservation to be executed before the processing reserved in block (1) has already been stored in the flash memory (the ROM 1120), the downloading of the FAX program is not performed.

Block (3): The CPU 1100 enters the reservation standby mode, and causes the digital multifunction machine 10 to enter the sleep mode. In the sleep mode, the FAX machine is powered off. In addition, the fusing unit and the drum heater of the main apparatus are powered off. The timer 3000 is powered on.

Block (4): At the reserved transmission start time, the timer 3000 turns on a power source unit 200 to start processing for starting the system.

Block (5): The CPU 1100 starts the system check program and the FAX program downloaded in the flash memory (that is, the ROM 1120). Since the CPU 1100 recognizes the reservation for FAX transmission, the CPU 1100 controls units associated with image formation, such as the fusing unit 226 and a drum heater (not shown), not to be electrically connected. Generally, the fusing unit 226 and the drum heater consume a large amount of electric power. Thus, prevention of unnecessary electric connection in this embodiment contributes to a reduction in power consumption. In addition, since the digital multifunction machine 10 is started in response to FAX transmission reservation, the user does not have to operate the digital multifunction machine 10. Thus, in this case, it is not necessary for the user to load the FAX function display program 1137 into the RAM 1110.

Block (6): The CPU 1100 performs reserved FAX transmission.

In the related art, after all the functions are downloaded from the HDD 1130 to the RAM 1110, the heater system of the digital multifunction machine 10 starts, and then, each of the functions starts. In contrast, in this embodiment, since a split FAX function is downloaded in advance to the flash memory (that is, the ROM 1120) that is capable of high-speed processing, the system can be started quickly.

In addition, since the CPU 1100 recognizes in advance a function to be executed (for example, a FAX transmission function), only a unit necessary for the function is started, and an unnecessary unit is kept off. Thus, energy savings can be achieved.

Block (7): After executing the reserved FAX transmission in block (6), the CPU 1100 rewrites a high-priority function stored in the flash memory (the ROM 1120). That is, the CPU 1100 deletes the FAX program downloaded in the ROM 1120 for the reserved function, and downloads a function set as a standard high-priority function (a default high-priority function: for example, the COPY function) to the ROM 1120. Then, the digital multifunction machine 10 enters the sleep mode. If a reservation for another function has been made, a program corresponding to the function, instead of the default high-priority function, is downloaded to the ROM 1120.

A process to start a reserved function according to this embodiment will be described with reference to the flowcharts shown in FIGS. 16 and 17.

Figure 16:
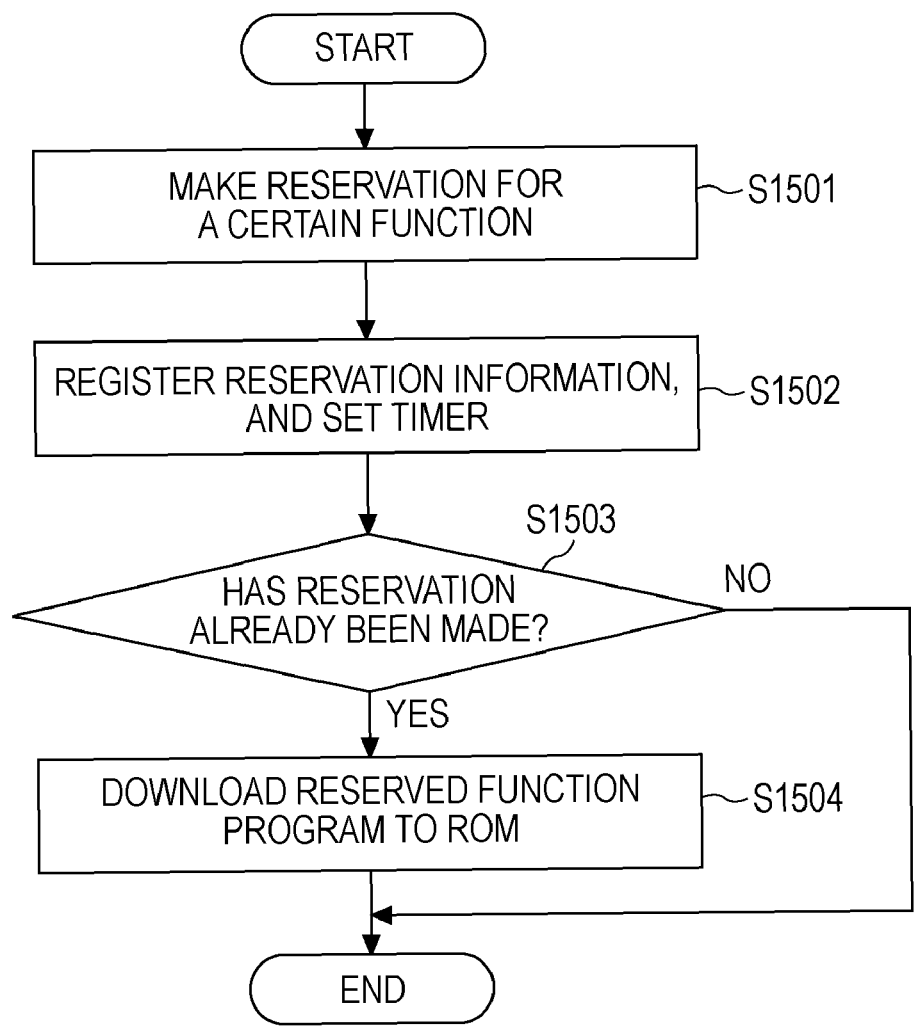
FIG. 16 is a flowchart showing an example of a control process performed by the digital multifunction machine.

FIG. 16 is a flowchart showing an example of a control process according to this embodiment, and the control process corresponds to a process for a reserved function stored in the ROM 1120 in this embodiment. The controller unit 100 performs the process shown by this flowchart. This process corresponds to a process realized when the CPU 1100 reads to the RAM 1110 a program (not shown) stored in the HDD 1130 and executes the read program. Processing in steps S1501 to S1504 will be described.

When the user makes, using the operation unit 2000, a reservation for processing of a certain function (step S1501), the CPU 1100 detects the reservation. In step S1502, the CPU 1100 stores reservation information in a reservation table (not shown) within the HDD 1130.

In addition, in step S1502, the CPU 1100 sets the timer 3000 to turn on the power at a reserved time.

In step S1503, the CPU 1100 determines whether or not a reservation to be executed before the reservation made in step S1501 has already been registered by searching a reservation table (not shown) within the HDD 1130. If it is determined in step S1503 that a reservation to be executed before the reservation made in step S1501 has already been registered, the CPU 1100 terminates the process and enters the sleep mode in accordance with predetermined conditions.

In contrast, if it is determined in step S1503 that a reservation to be executed before the reservation made in step S1501 has not been registered, the CPU 1100 proceeds to step S1504.

In step S1504, the CPU 1100 downloads a function program corresponding to the function reserved in step S1503 from the HDD 1130 to the flash memory (that is, the ROM 1120). Then, the CPU 1100 terminates the process, and enters the sleep mode in accordance with predetermined conditions. Alternatively, the power is turned off.

Figure 17:
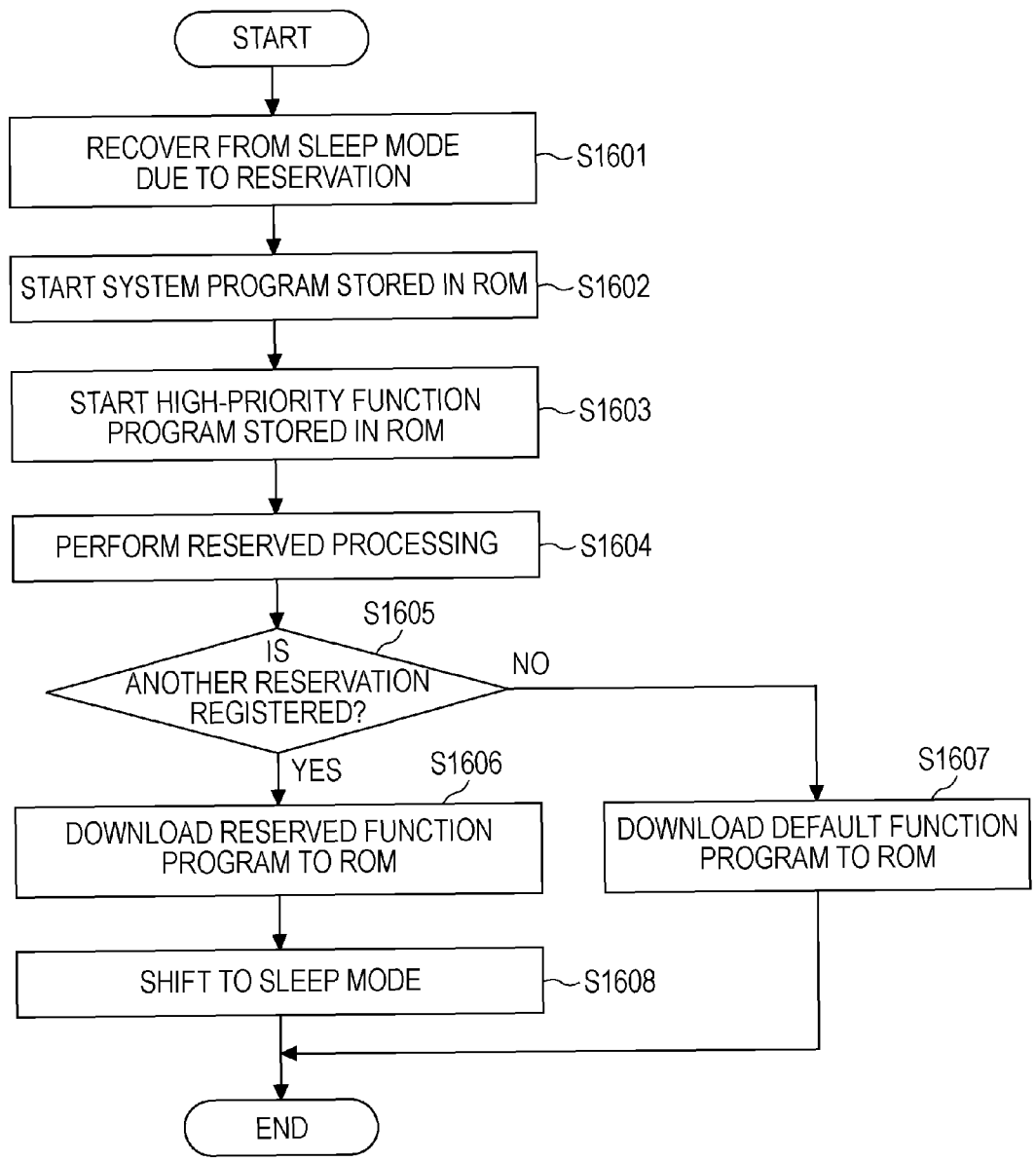
FIG. 17 is a flowchart showing an example of a control process performed by the digital multifunction machine.

FIG. 17 is a flowchart showing an example of a control process according to this embodiment. The control process corresponds to a process to start a reserved function according to this embodiment. The controller unit 100 performs the process shown by this flowchart. This process corresponds to a process realized when the CPU 1100 reads to the RAM 1110 a program (not shown) stored in the HDD 1130 and executes the read program. Processing in steps S1601 to S1608 will be described.

In step S1601, due to a reservation, the digital multifunction machine 10 recovers from the sleep mode. Then, in step S1602, the CPU 1100 starts a system check program stored in the flash ROM (that is, the ROM 1120). In step S1603, the CPU 1100 starts a function program downloaded in advance in the flash memory (that is, the ROM 1120).

In step S1604, the CPU 1100 controls reserved processing to be executed. Here, only a unit necessary for executing the processing is started, and an unnecessary unit is kept off. For FAX transmission processing, for example, a fusing unit and a drum heater of the main apparatus are kept off.

In step S1605, the CPU 1100 reads a reservation table within the HDD 1130 and determines whether or not another reservation is registered. If it is determined in step S1605 that no reservation is registered, the CPU 1100 proceeds to step S1607.

In step S1607, the CPU 1100 deletes the function program downloaded to the ROM 1120 for the reserved function. Then, the CPU 1100 controls a program for a default high-priority function to be downloaded from the HDD 1130 to the ROM 1120. Then, the CPU 1100 terminates the process.

In contrast, if it is determined in step S1605 that another reservation is registered, the CPU 1100 proceeds to step S1606.

In step S1606, the CPU 1100 deletes the function program downloaded to the ROM 1120 for the reserved function. Then, the CPU 1100 controls a function program corresponding to the reservation to be downloaded from the HDD 1130 to the ROM 1120. Then, the CPU 1100 proceeds to step S1608.

In step S1608, the CPU 1100 controls the digital multifunction machine 10 to enter the sleep mode, and terminates the process. If, for example, a user operation is input or a job is received in step S1608, the digital multifunction machine 10 does not enter the sleep mode.

According to the above-described process, in a split-program configuration including split functions, a program corresponding to a reserved function is downloaded to a flash memory that is capable of rapid access. Then, the function stored in the flash memory that is necessary for startup is preferentially started. With this configuration, in response to reserved processing, only a necessary function rapidly recovers from the power saving mode, so that reductions in the system startup time and in power consumption can be achieved. Thus, electric power is not unnecessarily consumed, resulting in power savings.

Each of the above-described functions is not limited to any of the descriptions above. Various configurations and components can be provided in accordance with applications and purposes.

Although embodiments of the present invention have been described, the present invention is applicable to a system, an apparatus, a method, a program, a storage medium, or the like. More specifically, the present invention may be applied to a system including a plurality of apparatuses or may be applied to an apparatus formed by a single device.

In the above descriptions, the term, such as startup of the power, turning on of the power, or start of the power, is not necessarily limited to startup of the power source. Such a term also means recovery from a power-saving mode (or a sleep mode) that needs a startup procedure similar to startup of the power source.

As described above, according to an aspect of the present invention, a digital multifunction machine is provided in which the highest-priority program is stored in the ROM 1120 and in which the other programs are started after being loaded from the HDD 1130 to the RAM 1110. In addition, according to an aspect of the present invention, a digital multifunction machine containing a ROM and supporting split programs is provided in which the highest-priority start-up program stored in the ROM 1120 by default can be replaced with another function by user setting.

For example, when a "print" function is selected in response to "quick startup setting" by a user, a printer program stored in the HDD 1130 is stored into the ROM 1120, instead of a COPY program stored in the ROM 1120 by default. Thus, the user is able to use a print function immediately after the power is turned on. In this case, the COPY program is stored from the HDD 1130 to the RAM 1110 and executed.

The expansion ROM 1121 may be added so that a program for a function set for quick startup can be downloaded to the expansion ROM 1121. Thus, the user is able to use both the default function and the program for the function set for quick startup by the user immediately after the startup, thus improving the convenience.

In addition, as the expansion ROM 1121, a mask ROM in which a program for a function to be rapidly started is written in advance as a pattern on a circuit before shipping may be added. Accordingly, since an inexpensive mask ROM is used, the cost can be reduced.

In addition, the user may load into an unused space of the RAM 1110 (a space left after a program for a default function is stored) a program having a small size stored in the HDD 1130.

As described above, a function desired by a user is available immediately after the power is turned on. Thus a digital multifunction machine is operable with a smaller user wait time. Thus, the convenience at the startup of the power source and at the recovery from the power-saving mode can be improved. Therefore, turning off of an apparatus and shift to the power-saving mode can be performed a large number of times. This contributes to energy savings.

In addition, an operation to be performed at the recovery from the sleep mode of the digital multifunction machine 10 may be reserved so that the CPU 1100 downloads to the ROM 1120 a program corresponding to the reserved function before the digital multifunction machine 10 enters the sleep mode.

Thus, the reserved function is available immediately after the power is turned on from the power-saving mode due to the reserved function. Thus, since electric power is not unnecessarily consumed, reductions in the system startup time and in power consumption can be achieved.

A configuration of a memory map of a storage medium in which various data processing programs readable by an information processing apparatus (or an image processing apparatus) according to an aspect of the present invention are stored will be described with reference to a memory map shown in FIG. 18.

FIG. 18 illustrates a memory map of a storage medium (or a recording medium) in which various data processing programs readable by an information processing apparatus (or an image processing apparatus) according to an aspect of the present invention are stored.

Although not particularly illustrated, information managing a program group stored in the storage medium, such as version information and a creator, may be stored and information that depends on an operating system (OS) or the like reading a program, such as an icon identifying the program, may be stored.

In addition, data depending on various programs is managed by the above-mentioned directory. In addition, a program for installing various programs into a computer, a decompressing program for decompressing a compressed program, and the like may be stored.

The functions shown in FIGS. 5, 8, 10, 16, and 17 according to the foregoing embodiments may be executed by a host computer in accordance with an externally installed program. In this case, the present invention is applicable to a case where an information group including a program is supplied from a storage medium, such as a compact disc read-only memory (CD-ROM), a flash memory, or a flexible disk, or from an external storage medium via a network, to an output device.

As described above, aspects of the present invention may be achieved by supplying a storage medium on which program code (software) for realizing the functions of the foregoing embodiments is recorded to a system or an apparatus and by reading and executing the program code stored in the stored in the storage medium by a computer (or a CPU or an microprocessing unit (MPU)) of the system or the apparatus.

In this case, the program code itself read from the storage medium attains new functions of the foregoing embodiments.

Thus, any type of program, such as object code, a program to be executed by an interpreter, or script data to be supplied to the OS, may be used as long as it includes a function of a program.

The storage medium for supplying a program may be, for example, a flexible disk, a hard disk, an optical disc, a magneto-optical (MO) disc, a compact disc ROM (CD-ROM), a compact disc-recordable (CD-R), a compact disc rewritable (CD-RW), a magnetic tape, a nonvolatile memory card, a ROM, a digital versatile disc (DVD), or the like.

In this case, the program code itself read from the storage medium attains new functions of the foregoing embodiments.

In addition, a program may be supplied by connecting to a homepage on the Internet using a browser of a client computer and by downloading the program according to an aspect of the present invention from the homepage to a storage medium, such as a hard disk. In addition, the program may be supplied by downloading a compressed file having an automatic installation function from the homepage to the storage medium, such as a hard disk. In addition, the program may be supplied by dividing program code constituting the program into a plurality of files and by downloading the divided files from different homepages. That is, a World Wide Web (WWW) server and a file transfer protocol (FTP) for allowing a plurality of users to download a program file for realizing function processing of the embodiments of the present invention on a computer are also included in the present invention.

A program according to an embodiment of the present invention may be encoded and stored in a storage medium, such as a CD-ROM, and may be distributed to users. Only a user who satisfies predetermined conditions may be able to download key information for decoding the encoded program from a homepage via the Internet. In addition, the encoded program can be executed by using the downloaded key information and can be installed to a computer.

In addition, the functions of the foregoing embodiments can be attained not only by executing the read program code by the computer but also by performing part or all of the actual processing by an OS or the like running on the computer on the basis of instructions of the program code.

Furthermore, the program code read from the storage medium may be written to a memory arranged in a function expansion board inserted into the computer or a function expansion unit connected to the computer. The functions of the foregoing embodiments can also be attained by performing part or all of the actual processing by the CPU or the like arranged in the function expansion board or the function expansion unit on the basis of instructions of the program code.

The foregoing embodiments may be applied to a system including a plurality of apparatuses or may be applied to an apparatus formed by a single device. The foregoing embodiments may be achieved by supplying a program to a system or an apparatus. In this case, the system or the apparatus achieves advantages of the present invention by reading to the system or the apparatus a storage medium on which the program represented by software for attaining the foregoing embodiments is stored.

The present invention is not limited to the foregoing embodiments. Various changes including organic combinations of the foregoing embodiments may be made within the spirit and scope of the present invention. Such various modifications may also fall within the scope of the present invention.

Various examples and embodiments of the present invention have been explained. It should be understood by those skilled in the art that the spirit and scope of the present invention are not limited to a specific description of this specification.

All the configurations including combinations of the foregoing embodiments and the modifications also fall within the present invention.

As described above, a function desired by a user is available immediately after the power is turned on, and a digital function machine is available with a smaller user wait time. Thus, the convenience in turning on of the power source and recovery from a power-saving mode can be improved.

In addition, since a function designated by reservation or the like is available immediately after the power is turned on from a power-saving mode or the like, the system startup time can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-014194 filed Jan. 23, 2006, which is hereby incorporated by reference herein in its entirety.

What is claimed is:

1. An image processing apparatus having a plurality of functions and allowing the plurality of functions to be available by starting programs for the corresponding functions, the apparatus comprising:
    a processor configured to execute the programs;
    a main memory configured to be used by the processor to execute the programs;
    a first storage unit configured to store a program to be executed by the processor without being transferred to the main memory;
    a second storage unit configured to store at least one program for a corresponding one of the plurality of functions, wherein the at least one program stored in the second storage unit can be executed by the processor by being transferred to the main memory;
    a selection unit configured to select any one of the plurality of functions; and
    a control unit configured to control a selected program corresponding to the function selected by the selection unit, from among the at least one program stored in the second storage unit, to be stored in the first storage unit.

2. The image processing apparatus according to claim 1, wherein the control unit is configured to control the selected program corresponding to the function selected by the selection unit and stored in the second storage unit to be stored in the first storage unit so as to be replaced with the program stored in advance in the first storage unit.

3. The image processing apparatus according to claim 1, wherein the control unit is configured to control the selected program corresponding to the function selected by the selection unit to be stored together with the program stored in advance in the first storage unit.

4. The image processing apparatus according to claim 1, further comprising:
    a reservation unit configured to reserve execution of processing corresponding to any one of the plurality of functions,
    wherein the selection unit is configured to select the function, which corresponds to the processing reserved by the reservation unit, from among the plurality of functions.

5. The image processing apparatus according to claim 4, further comprising:
    a timer unit configured to manage time at which the processing reserved by the reservation unit is performed,
    wherein when performing the processing reserved by the reservation unit in accordance with the time managed by the timer unit, the processor is configured to execute the program stored in the first storage unit.

6. The image processing apparatus according to claim 5, wherein the selection unit is capable of selecting a function set in advance, independent of the function corresponding to the processing reserved by the reservation unit, and
    wherein, after the processing reserved by the reservation unit is performed, the control unit is configured to control the program corresponding to the function set in advance to be stored in the first storage unit.

7. The image processing apparatus according to claim 5, wherein, when performing the processing reserved by the reservation unit, the processor is configured to not perform a program other than the program corresponding to the function reserved by the reservation unit.

8. The image processing apparatus according to claim 1, further comprising:
    a third storage unit configured to store a program other than the program stored in the first storage unit, wherein the program stored in the third storage unit can be executed by the processor without being transferred to the main memory.

9. The image processing apparatus according to claim 8, wherein the control unit is configured to control the selected program corresponding to the function selected by the selection unit, from among the at least one program stored in the second storage unit, to be stored in the third storage unit.

10. The image processing apparatus according to claim 8, wherein the program is written as a pattern on a circuit in the third storage unit.

11. A method for starting an image processing apparatus that is configured to execute a plurality of functions, that includes a processor configured to execute programs, a main memory configured to be used by the processor to execute the programs, a first storage unit configured to store a program to be executed by the processor without being transferred to the main memory, and a second storage unit configured to store at least one program for a corresponding one of the plurality of functions, wherein the at least one program stored in the second storage unit can be executed by the processor by being transferred to the main memory, and that allows the plurality of functions to be available by starting the programs for the corresponding functions, the method comprising:
    selecting any one of the plurality of functions; and controlling a selected program corresponding to the selected function, from among the at least one program stored in the second storage unit, to be stored in the first storage unit.

12. A storage medium storing therein a program for performing a method for starting an image processing apparatus that is configured to execute a plurality of functions, that includes a processor configured to execute programs, a main memory configured to be used by the processor to execute the programs, a first storage unit configured to store a program to be executed by the processor without being transferred to the main memory, and a second storage unit configured to store at least one program for a corresponding one of the plurality of functions, wherein the at least one program stored in the second storage unit can be executed by the processor by being transferred to the main memory, and that allows the plurality of functions to be available by starting the programs for the corresponding functions, wherein the method comprises:

selecting any one of the plurality of functions; and controlling a selected program corresponding to the selected function, from among the at least one program stored in the second storage unit, to be stored in the first storage unit.

\* \* \* \* \*